(12) United States Patent
Zheng et al.

(10) Patent No.: US 8,123,835 B2
(45) Date of Patent: Feb. 28, 2012

(54) HIGH RATE AND HIGH CRUSH-STRENGTH ADSORBENTS

(75) Inventors: Jian Zheng, Williamsville, NY (US); Steven John Pontonio, Eden, NY (US); Neil Andrew Stephenson, East Amherst, NY (US); Philip Alexander Barrett, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 351 days.

(21) Appl. No.: 12/529,198

(22) PCT Filed: Mar. 10, 2008

(86) PCT No.: PCT/US2008/056398
§ 371 (c)(1),
(2), (4) Date: Aug. 31, 2009

(87) PCT Pub. No.: WO2008/109882
PCT Pub. Date: Sep. 12, 2008

(65) Prior Publication Data
US 2010/0116134 A1    May 13, 2010

Related U.S. Application Data

(60) Provisional application No. 60/905,737, filed on Mar. 8, 2007.

(51) Int. Cl.
*B01D 53/04* (2006.01)
*B01J 20/18* (2006.01)
*B01J 20/28* (2006.01)

(52) U.S. Cl. ............... 95/90; 95/902; 502/79; 502/411

(58) Field of Classification Search ............... 96/108, 96/153; 95/90, 900, 902; 502/79, 411, 439, 502/514; 423/700, DIG. 21
See application file for complete search history.

(56) References Cited

U.S. PATENT DOCUMENTS

| | | |
|---|---|---|
| 3,296,151 A | 1/1967 | Heinze et al. |
| 4,870,223 A | 9/1989 | Ellig et al. |
| 4,925,460 A | 5/1990 | Coe et al. |
| 5,053,374 A | 10/1991 | Absil et al. |
| 5,106,803 A | 4/1992 | Mohr et al. |
| 5,120,693 A | 6/1992 | Connolly et al. |
| 5,948,726 A | 9/1999 | Moskovitz et al. |
| 6,090,738 A * | 7/2000 | Choudary et al. ............ 502/62 |

(Continued)

FOREIGN PATENT DOCUMENTS
WO    WO 92/12928    8/1992
(Continued)

*Primary Examiner* — Frank Lawrence, Jr.
(74) *Attorney, Agent, or Firm* — Salvatore P. Pace

(57) ABSTRACT

High rate and high crush-strength adsorbent particles and collections of such particles, and particularly LiLSX particles, are provided. A binder is employed in the form of a colloidal solution during the method of manufacture. Suitable binders include various silica binders. The particles are made using the steps of mixing, agglomeration, calcination and in the case of certain adsorbents such as LiX and LiLSX, ion exchange and activation. When the adsorption rate is expressed in the form SCRR/$\epsilon_p$ (mmol mm$^2$/g s), desirable collections of adsorbent particles can have values of at least 4.0 for the highly-exchanged Li (at least 90% Li exchanged) form of the collection of particles and can further be characterized by particles having average crush strengths of at least 0.9 lbf for particles having an average diameter of at least about 1.0 mm.

14 Claims, 10 Drawing Sheets

U.S. PATENT DOCUMENTS

| | | |
|---|---|---|
| 6,171,370 B1 | 1/2001 | Hirano et al. |
| 6,350,428 B1 * | 2/2002 | Verduijn et al. ............. 423/702 |
| 6,425,940 B1 | 7/2002 | Chao et al. |
| 6,444,014 B1 | 9/2002 | Mullhaupt et al. |
| 6,478,854 B1 * | 11/2002 | Kotagiri et al. ................ 95/96 |
| 6,500,234 B1 | 12/2002 | Ackley et al. |
| 6,649,556 B2 | 11/2003 | Masini et al. |
| 6,652,626 B1 * | 11/2003 | Plee ................................ 95/96 |
| 6,790,260 B2 | 9/2004 | Ackley et al. |
| 6,918,948 B2 * | 7/2005 | Jaussaud et al. ............... 95/116 |
| 7,300,899 B2 | 11/2007 | Weston et al. |
| 2002/0162452 A1 * | 11/2002 | Butwell et al. .................... 95/96 |

FOREIGN PATENT DOCUMENTS

| | | | |
|---|---|---|---|
| WO | WO 99/43417 | * | 9/1999 |
| WO | WO 2008/051904 A1 | | 5/2008 |

* cited by examiner

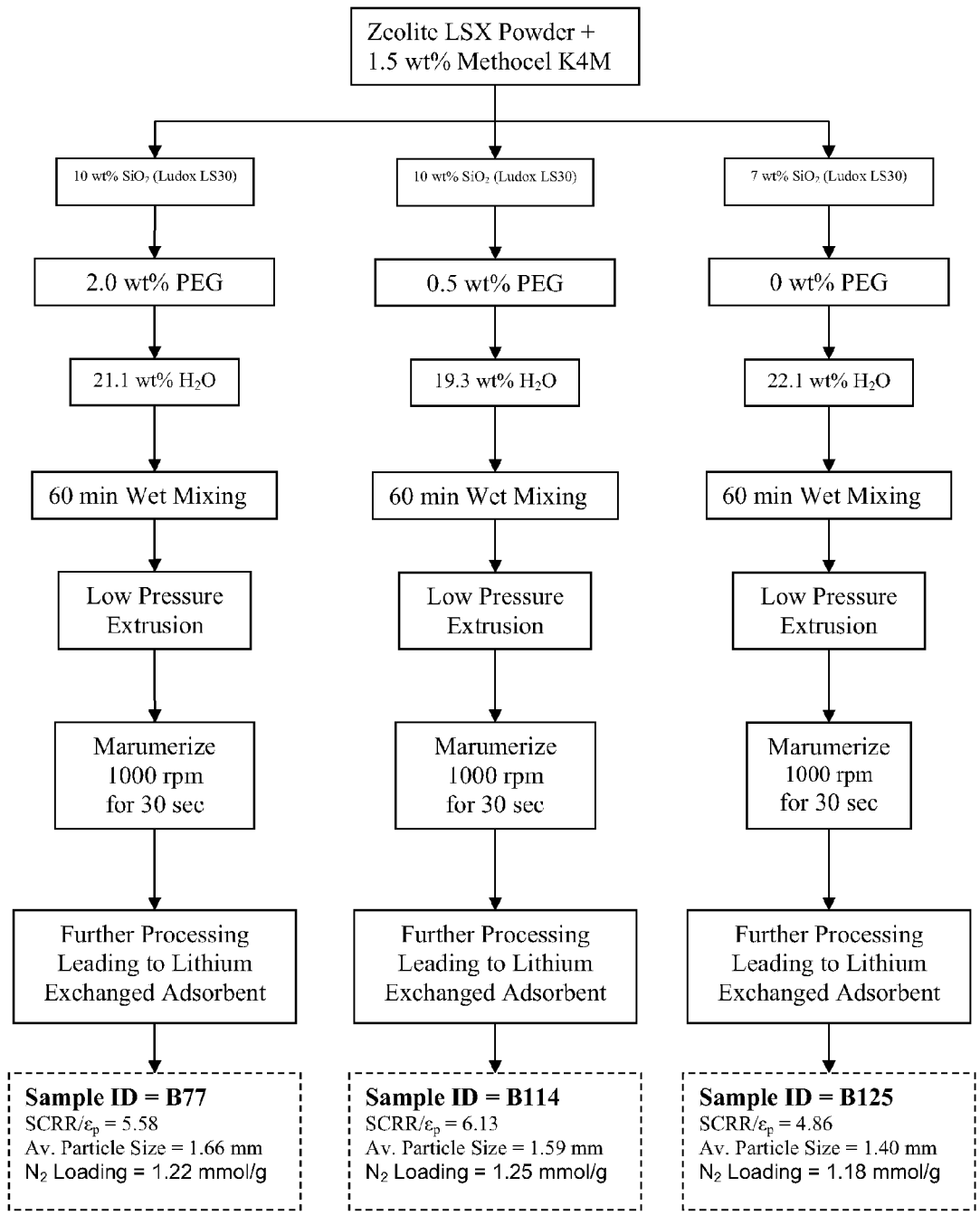
*Figure 1. Sequence of processing steps and conditions for LiLSX zeolite samples prepared according to the procedure described in Example 1 and 3, together with selected performance data. See Table 1 for definition and units of the performance measures.*

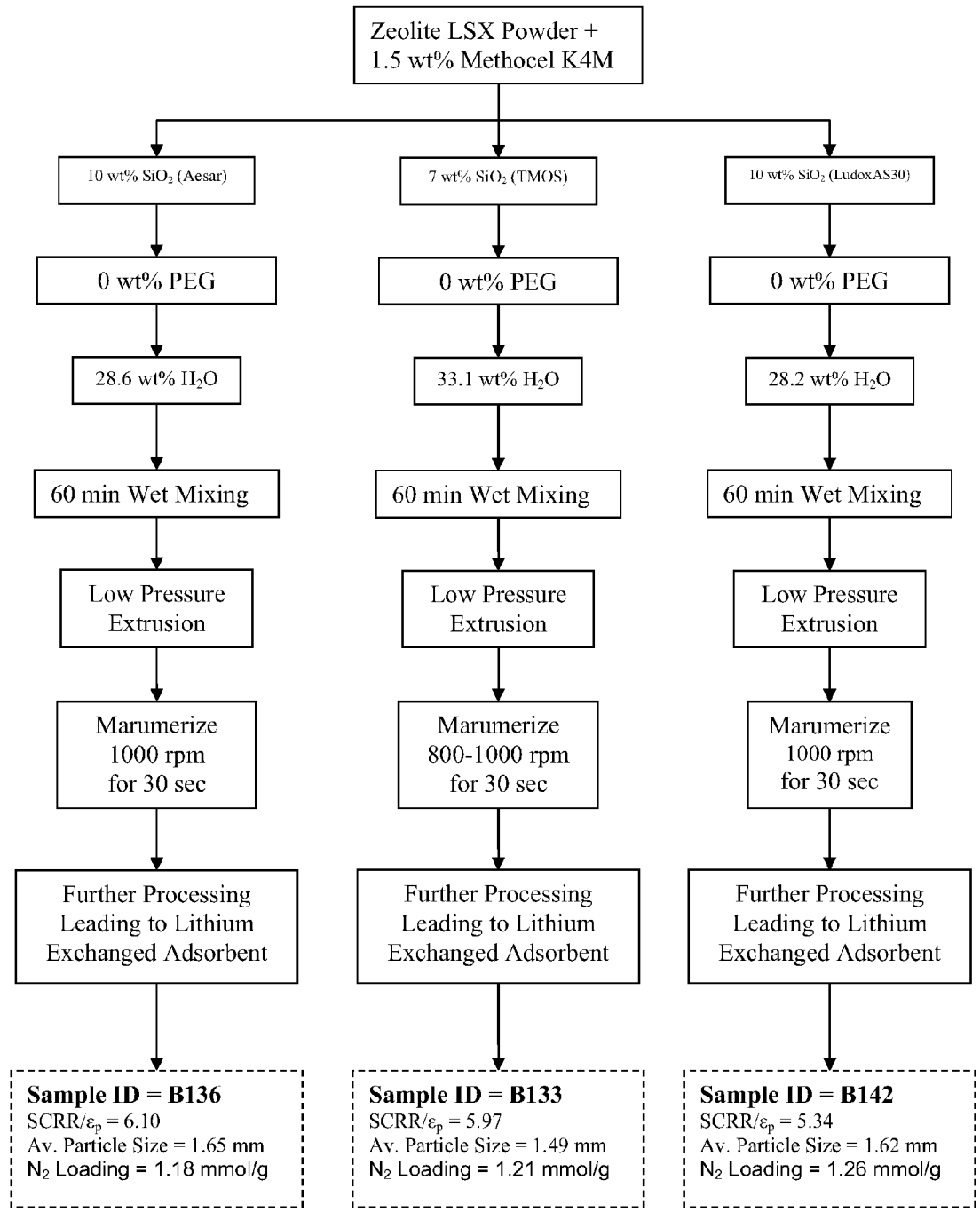
Figure 2. Sequence of processing steps and conditions for LiLSX zeolite samples prepared according to the procedure described in Example 2 and 4, together with selected performance data. See Table 1 for definition and units of the performance measures.

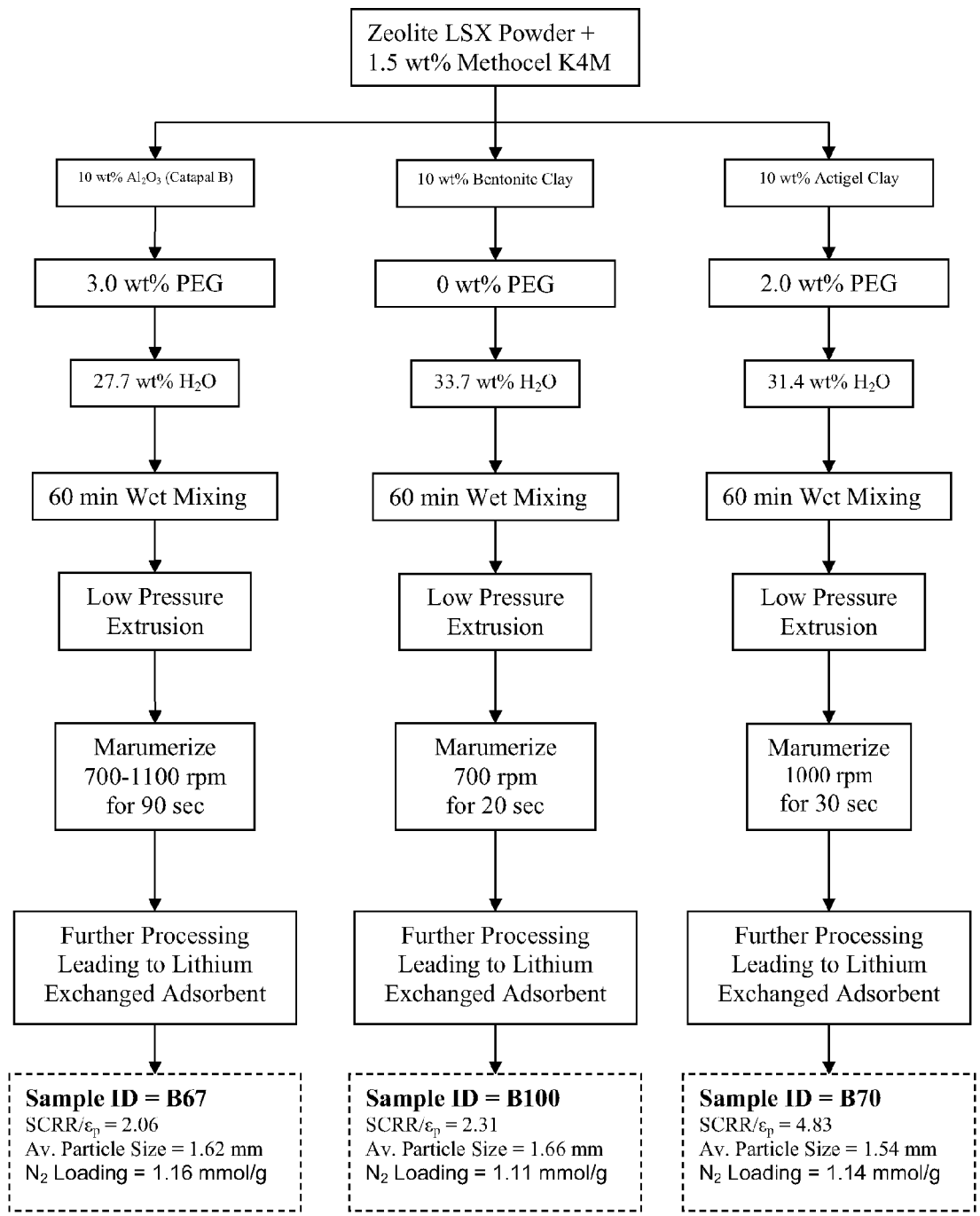
Figure 3. Sequence of processing steps and conditions for LiLSX zeolite samples prepared according to the procedure described in Example 5 and 6, together with selected performance data. See Table 1 for definition and units of the performance measures.

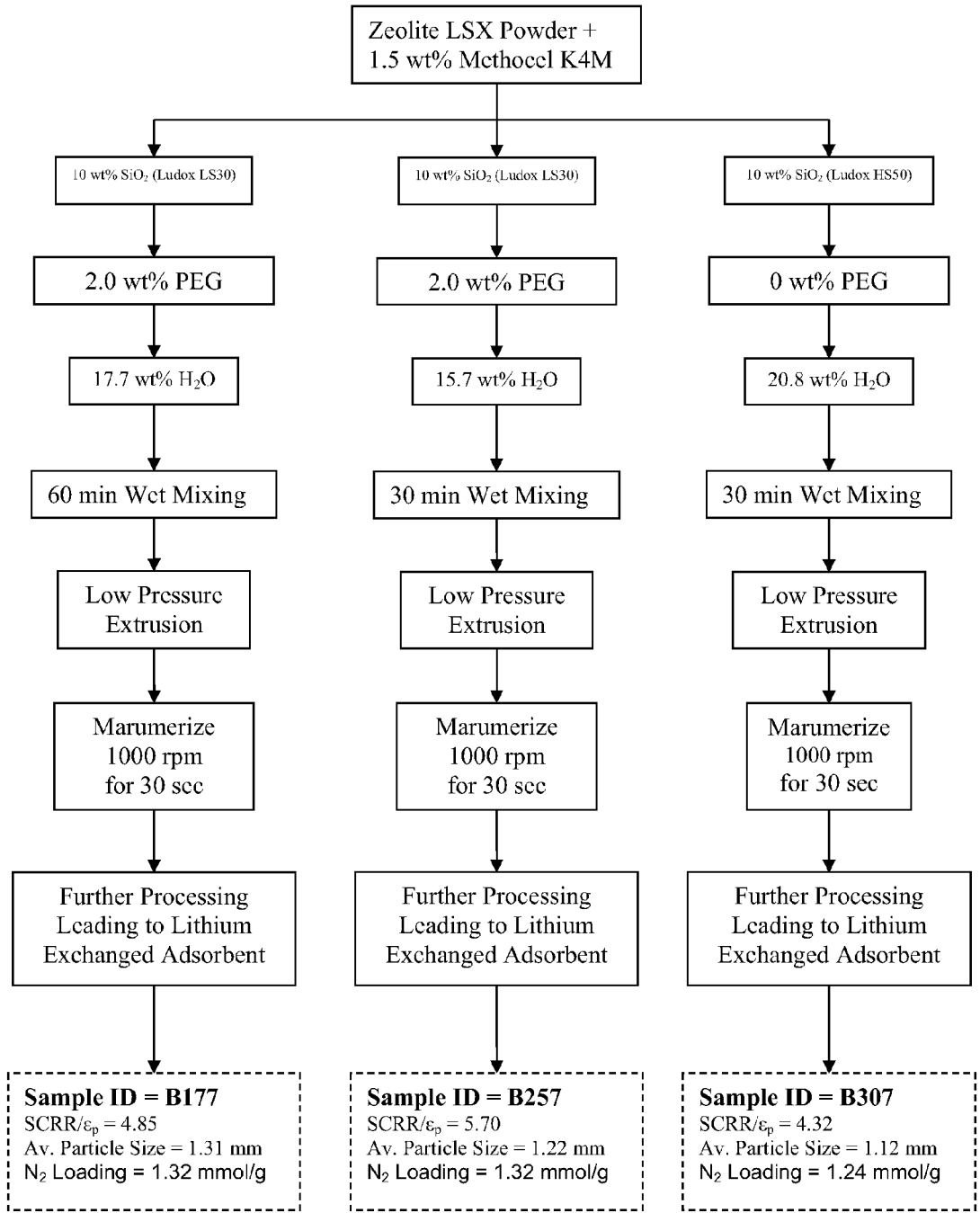
Figure 4. Sequence of processing steps and conditions for LiLSX zeolite samples prepared according to the procedure described in Example 7 and 8, together with selected performance data. See Table 1 for definition and units of the performance measures.

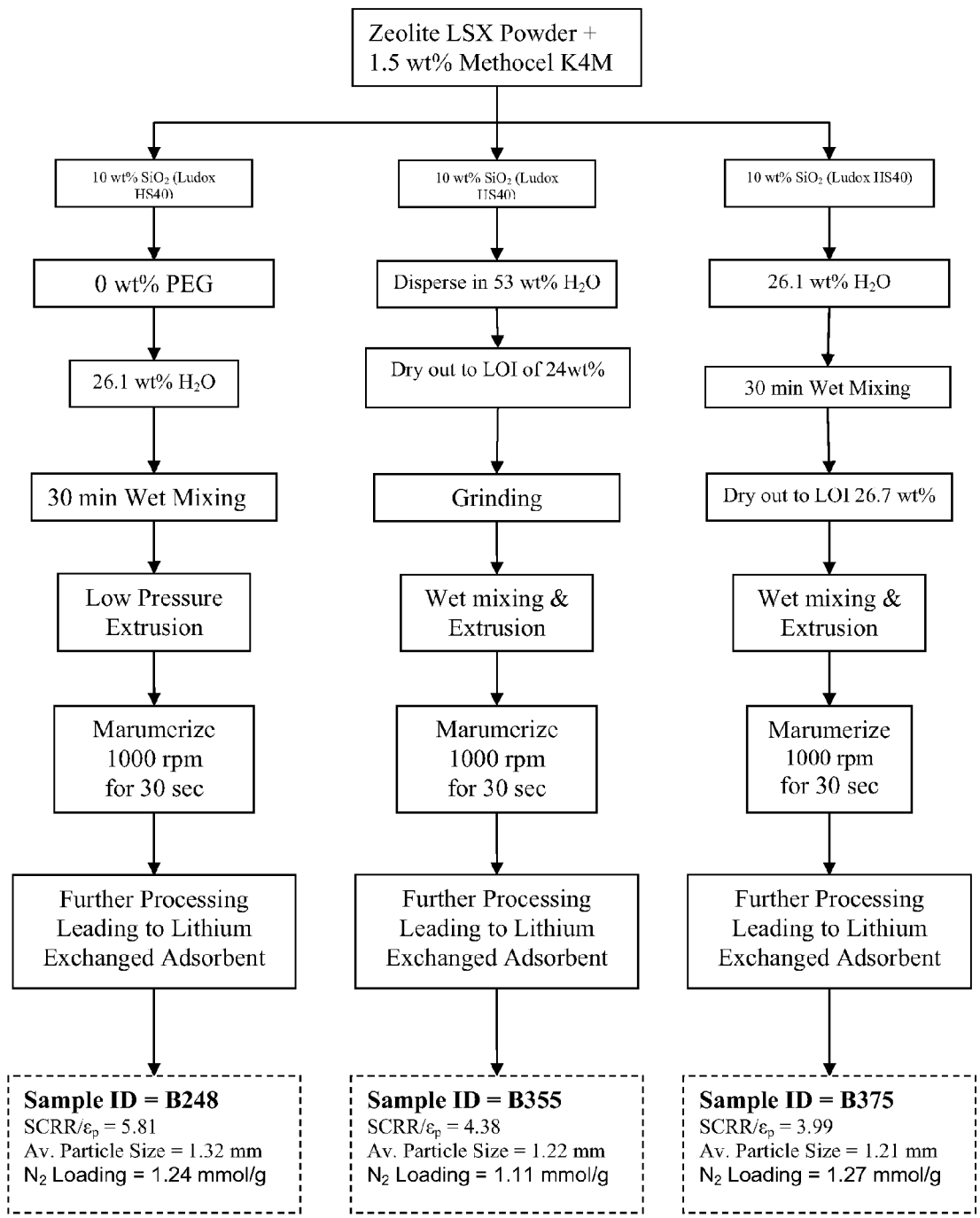
Figure 5. Sequence of processing steps and conditions for LiLSX zeolite samples prepared according to the procedure described in Example 8 and 9, together with selected performance data. See Table 1 for definition and units of the performance measures.

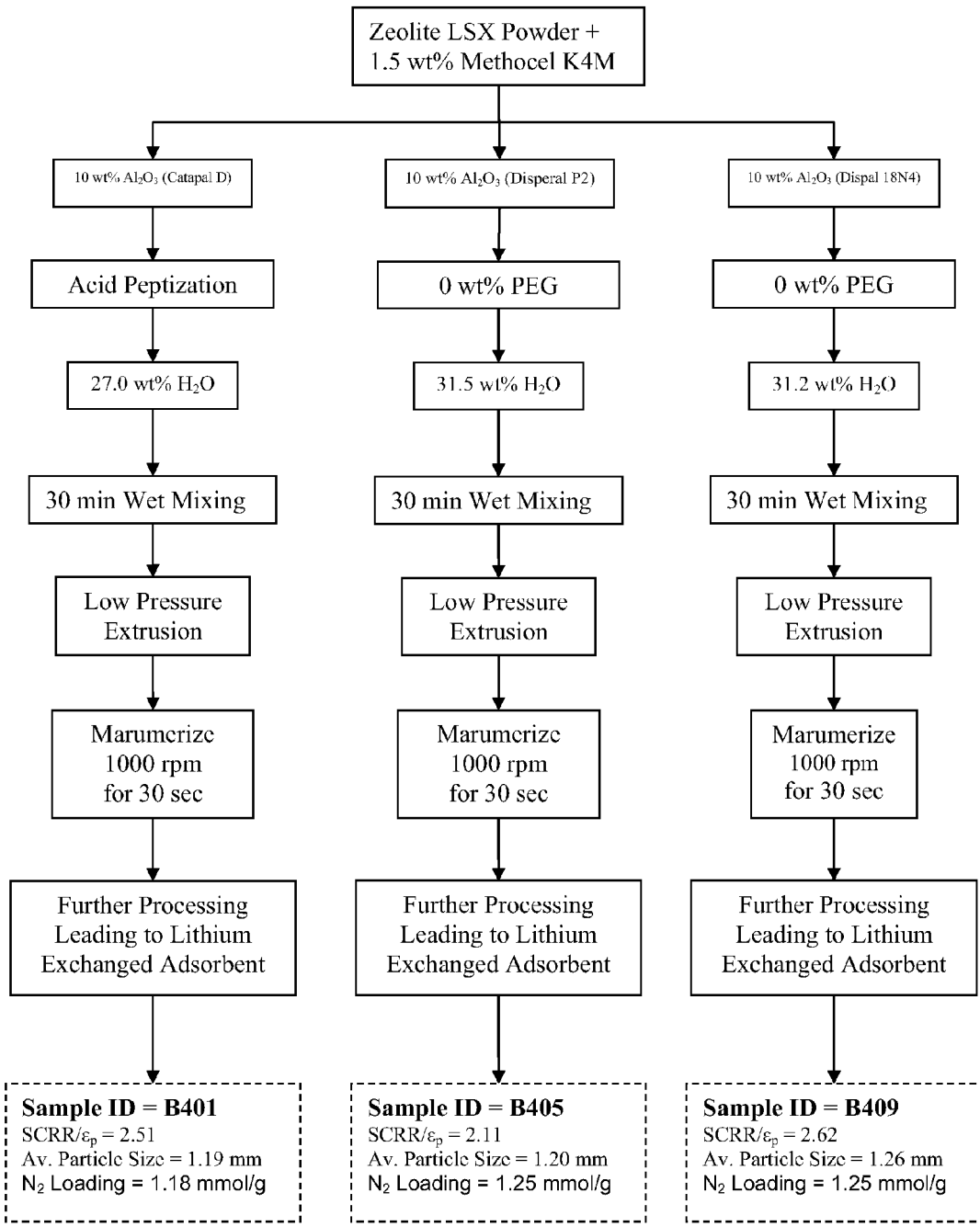
*Figure 6. Sequence of processing steps and conditions for LiLSX zeolite samples prepared according to the procedure described in Example 10, together with selected performance data. See Table 1 for definition and units of the performance measures.*

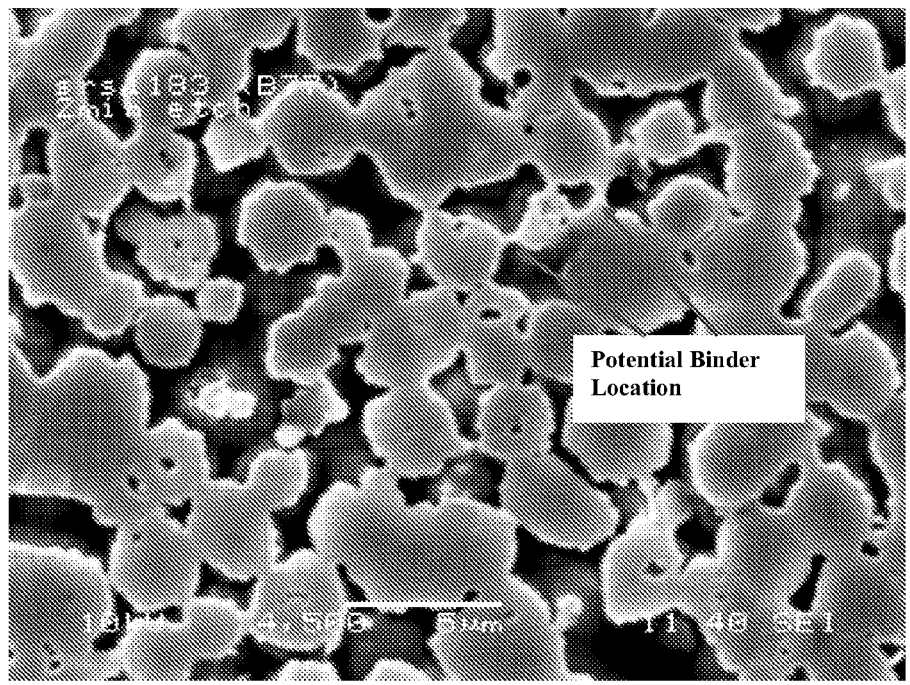
Figure 7. SEM image of a cross section of sample B77 (see Table 1). The zeolite crystals are easily discernable, but the location of the silica binder is unclear.

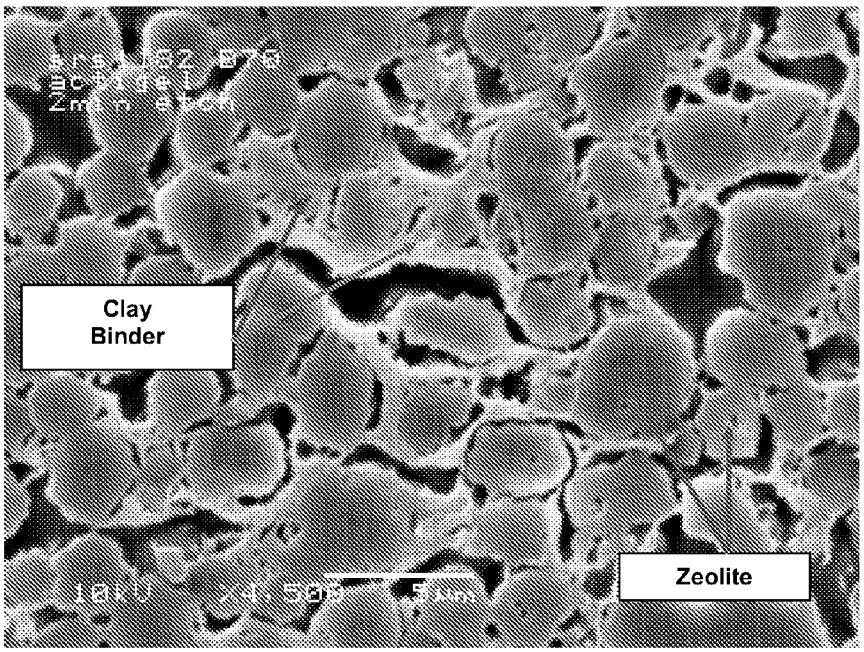

Figure 8. SEM image of a cross section of sample B70 (see Table 1). Unlike the silica bound sample (B77 see Figure 7) the location of the clay binder is readily discernable in the above image.

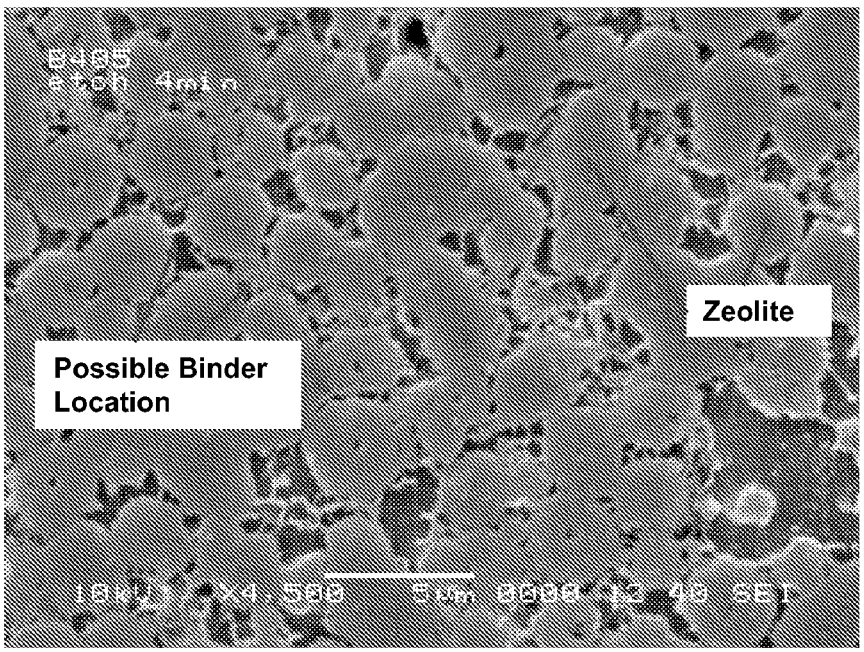

Figure 9. SEM image of a cross section of sample B405 (see Table 1). The zeolite crystals appear to be inter-dispersed by short fiber-like alumina species. Unlike the silica bound sample (B77 see Figure 7), the alumina is discernible and appears to be filling in some of the macropores.

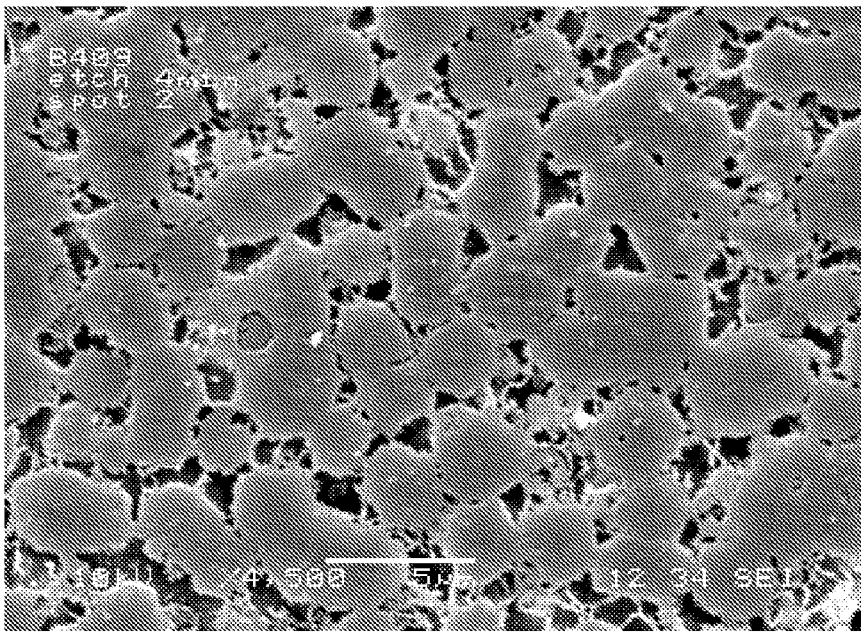
Figure 10. SEM image of a cross section of sample B409 (see Table 1). The zeolite crystals appear to be inter-dispersed by short fiber-like alumina species. Unlike the silica bound sample (B77 see Figure 7), the alumina is discernible and appears to be filling in some of the macropores.

HIGH RATE AND HIGH CRUSH-STRENGTH ADSORBENTS

CROSS REFERENCE TO RELATED APPLICATION

This application claims priority to U.S. provisional patent application Ser. No. 60/905,737, filed Mar. 8, 2007, the contents of which are incorporated herein by reference in their entirety.

TECHNICAL FIELD

The present invention generally relates to high-rate gas separation adsorbents used in pressure swing adsorption (PSA), vacuum pressure swing adsorption (VPSA), and temperature swing adsorption (TSA) processes.

BACKGROUND ART

Separations of a gas from admixture with other gases are important industrial processes. In such processes the objective may be either to obtain a product gas enhanced in a particular gas or a product from which that particular gas has an undesired constituent removed therefrom. For example, there are commercial scale processes to separate air to obtain nitrogen, oxygen, and argon and for air prepurification.

Air separation can be accomplished using adsorption processes, in particular, pressure swing (PSA) and vacuum pressure swing types (VPSA). In PSA and VPSA processes, compressed air is pumped through a fixed bed of an adsorbent exhibiting an adsorptive preference for one of the main constituents whereby an effluent product stream enhanced in the non-adsorbed (or lesser adsorbed) constituent is obtained. Compared to cryogenic processes, adsorption processes for air separation require relatively simple equipment and are relatively easy to maintain. Adsorption processes, however, typically have lower product recovery than many cryogenic processes. For this reason, improvements in the adsorption processes remain important goals. One principal means of improvement is the discovery and development of better adsorbents.

One way to improve adsorption is to enhance the mass transfer rate of adsorbent materials, particularly those used in PSA and VPSA. With a fast mass transfer rate, one can have short cycle time and low power consumption and therefore high adsorbent productivity and high process efficiency in PSA/VPSA systems and processes. It has been recognized that it is possible to shorten cycle time by reducing particle size of adsorbent aggregates. This recognition has been based upon the assumption that the time needed for adsorbates to travel through the macropores of the agglomerated adsorbent particles limits the adsorption/desorption cycle time, i.e., macropore diffusion is the rate limiting step in adsorption processes. It has also been recognized that increased porosity will improve macropore diffusion and decreasing binder content may result in increased porosity. However, it is also desirable to use an adsorbent with high crush strength. Too little binder may result in a weak adsorbent particle that will collapse in the bed and too much binder will strengthen the adsorbent particle, but may create a particle that is too dense, resulting in a poor mass transfer rate.

There are many adsorbent compositions and manufacturing processes known in the art for air separation processes and/or for hydrocarbon processing. For example, U.S. Pat. No. 5,053,374 (Absil et al.) describes the use of a colloidal binder to prepare extrudates of zeolite materials for catalysis applications including hydrocarbon processing. Absil et al. define "zeolite" as porous crystalline silicates that contain silicon and oxygen as predominant framework atoms and other components such as aluminum are present in minor amounts. Furthermore, the colloidal binder is preferably a low acidity refractory oxide (with oxides of silicon, titanium, germanium and zirconium being most useful), which functions to lower the acidity of the catalyst and reduce coking in hydrocarbon conversion processes. Absil et al. teach making extrudates with high binder content (e.g., 35 wt % silica) in combination with screw extrusion to produce dense particles with high levels of compaction.

U.S. Pat. No. 3,296,151 (Heinze et al.) describes zeolite granules bonded with silica and made by a sol-gel conversion process designed to yield spherical particles. The molecular sieve content should be between 50-90% and the concentration of MgO (used in the granulation process as a gelling agent) should be between 0.1-3%. Heine et al. teach sol-gel conversion and bead formation from droplets.

U.S. Pat. No. 5,120,693 (Connolly et al.) describes agglomerates of molecular sieve in the size range 40-800 μm, which are formed using a silica bonding agent, wherein the silica particles are in the range 5-20 nm. A spray drying technique is used to make these small adsorbent particles and these molecular sieves are classified as high silica molecular sieves and have $SiO_2/Al_2O_3$ ratios greater than 18.

U.S. Pat. No. 5,948,726 (Moskovitz et al.) discloses adsorbents and/or catalysts that are bound with colloidal oxides in the presence of acid which is a necessary component of the formulation, and serves to cross-link the binder with the adsorbent or catalyst component. The use of an acid to cross-link the binder to the adsorbent may be detrimental to the performance of low silica zeolite adsorbents characterized by $SiO_2/Al_2O_3$ ratios of less than or equal to 3, which possess lower stabilities than the higher silica zeolites taught by Moskovitz et al. Acids of the types deemed suitable by Moskovitz et al. can damage or destroy low silica zeolites.

Increased binder content provides higher crush strength, but may cause matting and inhomogeneity in the adsorbent particles. This can lead to lower mass transfer rates and inconsistent adsorbent particles. There remains a need for adsorbents with both high crush strength and high mass transfer rate and processes for consistently making such adsorbents.

SUMMARY OF THE INVENTION

The present invention generally relates to high rate adsorbents and collections of adsorbent particles with high crush strengths that can be formed using colloidal binders. The present invention further relates to methods of making such adsorbents and collections of adsorbent particles.

More specifically, the present invention describes collections or groups of adsorbent particles. As used herein, "particle" or "particles" refers respectively to a particle or particles that are bead(s) or pellet(s) (i.e. extrudates). The particles include an adsorbent material and not greater than about 18 wt % of a binder in the final product. The number of particles in a given collection or group can vary significantly depending on the desired product and/or intended use. The present invention more particularly relates to adsorbents in which the adsorbent particles have average diameters in the range of about 0.5-3.0 mm, and more preferably have average diameters in the range of about 0.8-2.0 mm. The collections of adsorbent particles are characterized by SCRR/$\epsilon_{p_2}$ (size compensated relative rate/porosity) values (mmol mm²/g s) equal to or greater than 4.0 as measured using the Li form (for example, LiX or LiY) of the collection of particles when the Li form has equal to or greater than 90% of its exchangeable cations (i.e. highly-exchanged) replaced by Li (where the degree of exchange is expressed as a ratio between the number of Li cations and number of aluminum atoms of the adsorbent (e.g., zeolite) present in tetrahedral positions). Such adsorbent particles (where particles are beads or pellets (i.e. extrudates)) are further characterized by average crush strengths of at least 0.8 lbf (as measured by the single bead crush strength method) for adsorbent particles having average diameters in the range of 0.5 to less than about 1.0 mm or having average crush strengths of at least 0.9 lbf and preferably at least 1.0 lbf (as measured by the single bead crush strength method) for adsorbent particles having average diameters in the range of about 1.0-3.0 mm.

In some embodiments, such collections of particles are characterized by beads having an average diameter of at least 1.5 mm and SCRR/$\epsilon_p$ (size compensated relative rate/porosity) values equal to or greater than 5.0 as measured using the Li form of the collection of particles when the Li form has equal to or greater than 90% of its exchangeable cations replaced by Li and having average crush strengths of at least 0.9 lbf, and preferably at least 1.0 lbf, (as measured by the single bead crush strength method). Such collection of adsorbent particles can also have an effective pore diffusivity of at least about $4.0 \times 10^{-6}$ m$^2$/s when measured at 1.5 bar and 300K.

In some other embodiments, such collections of adsorbent particles are characterized by beads having an average diameter of about 1.0-1.2 mm and SCRR/$\epsilon_p$ (size compensated relative rate/porosity) values equal to or greater than 4.0 as measured using the Li form of the collection of adsorbent particles when the Li form has equal to or greater than 90% of its exchangeable cations replaced by Li and having average crush strengths of at least 0.9 lbf, and preferably at least 1.0 lbf, (as measured by the single bead crush strength method).

The specified particle size ($d_{particle}$), for the adsorbent particles described throughout this disclosure is the average particle size, as determined for example by the screen analysis (using a series of screens of appropriate mesh sizes) known to those skilled in the art. Thus, while the invention is expected to be suitable for use with adsorbent particles having diameters in the range of 0.5-3.0 mm, a reference herein to a collection of adsorbent particles having a specified diameter refers to particles within a collection of adsorbent particles distributed over a range of sizes.

As mentioned above, the adsorbent particles of the present invention include a binder. The binder is added in colloidal form during the manufacturing process (e.g., mixing and/or agglomeration stages of the manufacturing process). The percentage of binder used to manufacture adsorbent particles in accordance with the present invention is determined based on the original composition (i.e. the non ion-exchanged form of the adsorbent particle) on a total dry weight basis. More specifically, the binder content used for manufacture can be expressed as: (binder$_{(dry\ wt)}$/(adsorbent$_{(dry\ wt)}$+binder$_{(dry\ wt)}$)× 100). In accordance with the present invention, the percentage of binder used for manufacture is about 15 wt % or less of the original composition (i.e. the non ion exchanged form of the adsorbent particle) on a total dry weight basis, preferably less than or equal to about 10 wt %. In some embodiments, the binder content may be 5-7 wt % of the original composition (i.e. the non ion exchanged form of the adsorbent particle) on a total dry weight basis. Once the amount of desirable binder is determined, the binder is employed in a colloidal form for purposes of manufacture. Utilizing the colloidal binder solutions in accordance with the processes and methods of the present invention allows for well-dispersed and homogeneous distribution of the binder in the adsorbent (e.g., zeolite) particle product form. Consequently, the adsorbent (e.g., zeolites) particles and collections of such particles of the present invention are characterized by high-rate and high crush-strength as described hereinbelow.

When the manufacturing process does not include an ion exchange step the weight percentage of the binder will be approximately the same as that calculated for manufacture. The amount of binder content in the final product adsorbent (e.g., zeolite) particles in accordance with the present invention can vary slightly however when the adsorbent (e.g. zeolite) particles have been subjected to ion exchange. For example and while not to be construed as limiting, when a binder content of 10 wt % is used in a starting NaKLSX material, the binder in the LiLSX form can correspond up to about 11.5 wt %. For a maximum binder content of 15% in the starting material, the binder content in a final LiLSX product can be up to about 17.4 wt % and in a NaLSX product (where the original composition has been ion-exchanged with Na to replace potassium) can be up to about 15.6 wt %. The reason for the change in binder percentage is the difference in molecular weight of the zeolite starting material and the ion exchanged product. In the last two examples, after ion exchange, the zeolite has a lower molecular weight than the starting zeolite compared on the same dry basis. As a result, the fraction of binder increases in the product.

When the adsorbent particles are other than the highly-exchanged (i.e., equal to or greater than 90%) Li form (for example, the Na form of the adsorbent such as NaX or NaY), the respective SCRR/$\epsilon_p$, values may be other than at least 4.0. If such collection of adsorbent particles are properly manufactured in accordance with the present invention, however, such collection of particles should have SCRR/$\epsilon_p$ values equal to or greater than 4.0 for adsorbent particles having average particle sizes in the range 0.5-3.0 mm described herein when exchanged to the corresponding highly-exchanged Li form of the collection of adsorbent particles.

Suitable adsorbents include zeolites and more particularly zeolite X having SiO$_2$/Al$_2$O$_3$ ratios in the range 2.5-2.0. Preferred adsorbents include, but are not limited to, low silica zeolite X materials having SiO$_2$/Al$_2$O$_3$ ratios close to 2.0 (i.e. LSX). Other adsorbents suitable for use in the invention include, but are not limited to other low silica zeolites including zeolite A, zeolite Y, mordenite, chabazite, and clinoptilolite.

The colloidal binder can be selected from the group of silicas. The binder is added during the mixing and/or agglomeration stages of the manufacturing process. These adsorbent particles can be made by both conventional pan granulation (or pan-pelletization) as well as extrusion-marumerization. After agglomeration the adsorbent particles should be calcined to remove any removable components and set the binding agents. The composition of the adsorbents may be further modified by ion exchange and/or impregnation techniques known by those skilled in the art.

The present invention also includes formulation and mixing protocols which facilitate dispersion of the binder and avoid matting and in-homogeneity with respect to the binder distribution. In addition, agglomeration methods in accordance with the present invention can maintain the high dispersion of binder and achieve an adsorbent (i.e. (bead) particle structure with the collection of such particles having SCRR/$\epsilon_p$ values of at least 4.0 (as measured on adsorbents in which at least 90% of the exchangeable cations in the collection of particles are exchanged with lithium, where the degree of exchange is expressed as a ratio between the number of Li cations and number of aluminum atoms of the adsorbent (e.g.

zeolite) present in tetrahedral positions) and crush strengths as previously described and as described hereinbelow.

In accordance with the present invention, it is expected that high rate, high crush-strength adsorbent particles in a beaded form can be prepared and used in adsorption processes, and especially within packed bed adsorption processes, to increase productivity of the adsorption process and to lower the risk of fluidization and attrition.

High adsorbent material (e.g., zeolite) contents (i.e. low binder content) are desirable to maximize the adsorption capacity and separation performance of the resulting adsorbent particles. Another feature of the present invention is that the methods of making the adsorbent particles are designed to give adsorbent particles (i.e. beads) with high mass transfer rates. This is achieved by controlling the forming method to produce particles (i.e. beads) which have good pore structure offering minimal mass transfer resistances.

The present invention can also produce adsorbent particles in which the particles have a high dispersion of the binder, and avoid the formation of binder rich regions within a particle which can act as barriers to mass transport.

The properties of the adsorbent particle (i.e., porosity, pore size distribution, tortuosity, pore-structure, crush strength, attrition, resistance and particle size distribution and the like) can be highly dependent upon the processing method. Moreover, in cases where the adsorbent particles described herein are made by extrusion-marumerization (or spheronization), the rate and/or other properties can change as a result of the extrusion and/or the marumerizer stages. In accordance with the present invention, the methods of manufacturing (agglomeration steps for example) and the formulations are to be adjusted based on equipment and techniques used in order to produce desirable adsorbent particles, especially low silica zeolite adsorbent particles (e.g., LSX adsorbent particles), with high crush strength and high rate characteristics.

BRIEF DESCRIPTION OF THE DRAWINGS

For a more complete understanding of the present invention and the advantages thereof, reference should be made to the following Detailed Description taken in conjunction with the accompanying drawings:

FIG. 1 illustrates the sequence of processing steps and conditions for LiLSX zeolite samples prepared according to the procedure described in Examples 1 and 3, together with selected performance data. See Table 1 for definition and units of the performance measures.

FIG. 2 illustrates the sequence of processing steps and conditions for LiLSX zeolite samples prepared according to the procedure described in Examples 2 and 4, together with selected performance data. See Table 1 for definition and units of the performance measures.

FIG. 3 shows the sequence of processing steps and conditions for LiLSX zeolite samples prepared according to the procedure described in Examples 5 and 6, together with selected performance data. See Table 1 for definition and units of the performance measures.

FIG. 4 shows the sequence of processing steps and conditions for LiLSX zeolite samples prepared according to the procedure described in Examples 7 and 8, together with selected performance data. See Table 1 for definition and units of the performance measures.

FIG. 5 illustrates the sequence of processing steps and conditions for LiLSX zeolite samples prepared according to the procedure described in Examples 8 and 9, together with selected performance data. See Table 1 for definition and units of the performance measures.

FIG. 6 shows the sequence of processing steps and conditions for LiLSX zeolite samples prepared according to the procedure described in Example 10, together with selected performance data. See Table 1 for definition and units of the performance measures.

FIG. 7 is a scanning electron microscope (SEM) image of a cross section of sample B77 (see Table 1). The zeolite crystals are easily discernable, but the location of the silica binder is unclear.

FIG. 8 is a scanning electron microscope image (SEM) image of a cross section of sample B70 (see Table 1). The zeolite crystals and the location of the clay binder are both readily discernable in the image.

FIG. 9 is a scanning electron microscope image (SEM) image of a cross section of sample B405 (see Table 1).

FIG. 10 is a scanning electron microscope image (SEM) image of a cross section of sample B409 (see Table 1).

DETAILED DESCRIPTION

Figure 11:
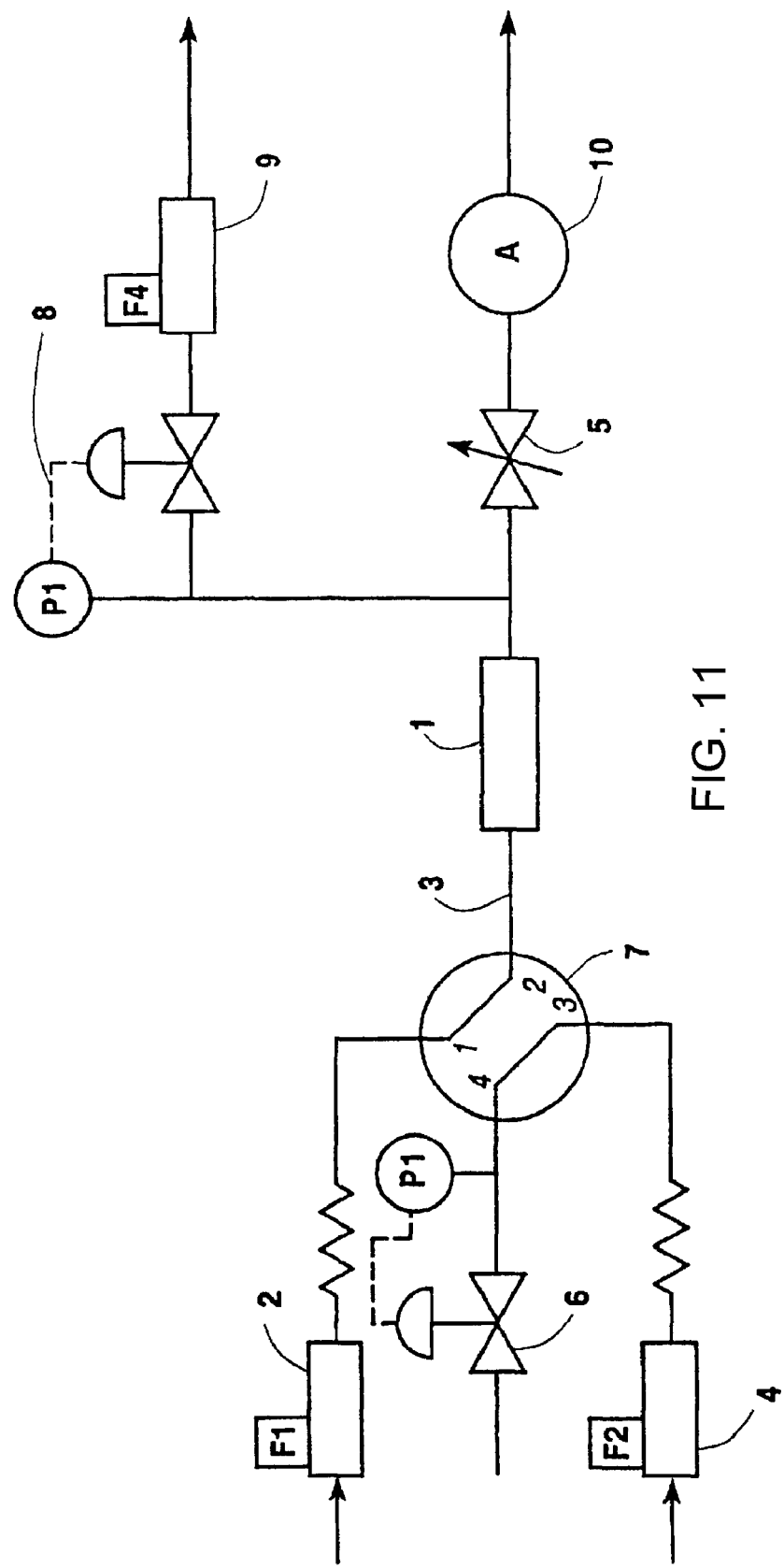
FIG. 11 is a schematic diagram showing the apparatus used to carry out the breakthrough test to determine intrinsic adsorption rate.

The present invention generally relates to high rate adsorbents or collections of adsorbent particles with high crush-strengths and methods of making such adsorbents or collections of adsorbents using colloidal binders.

More specifically, the present invention describes collections or groups of adsorbent particles. As used herein, "particle" or "particles" refers respectively to a particle or particles that are bead(s) or pellet(s) (i.e. extrudates). The particles include an adsorbent material and not greater than about 18 wt % of a binder in the final product. The number of particles in a given collection or group can vary significantly depending on the desired product and/or intended use. The present invention more particularly relates to adsorbents in which the adsorbent particles have average diameters in the range of about 0.5-3.0 mm, and more preferably have average diameters in the range of about 0.8-2.0 mm. The collections of adsorbent particles are characterized by SCRR/$\epsilon_p$ (size compensated relative rate/porosity) values (mmol mm$^2$/g s) equal to or greater than 4.0 as measured using the Li form (for example, LiX or LiY) of the collection of particles when the Li form has equal to or greater than 90% of its exchangeable cations (i.e. highly-exchanged) replaced by Li (where the degree of exchange is expressed as a ratio between the number of Li cations and number of aluminum atoms of the adsorbent (e.g., zeolite) present in tetrahedral positions). Such adsorbent particles (where particles are beads or pellets (i.e. extrudates)) are further characterized by average crush strengths of at least 0.8 lbf (as measured by the single bead crush strength method) for adsorbent particles having average diameters in the range of 0.5 to less than about 1.0 mm or having average crush strengths of at least 0.9 lbf and preferably at least 1.0 lbf (as measured by the single bead crush strength method) for adsorbent particles having average diameters in the range of about 1.0-3.0 mm.

In some embodiments, such collections of particles are characterized by beads having an average diameter of at least 1.5 mm and SCRR/$\epsilon_p$ (size compensated relative rate/porosity) values equal to or greater than 5.0 as measured using the Li form of the collection of particles when the Li form has equal to or greater than 90% of its exchangeable cations replaced by Li and having average crush strengths of at least 0.9 lbf, and preferably at least 1.0 lbf, (as measured by the single bead crush strength method). Such collection of adsorbent particles can also have an effective pore diffusivity of at least about $4.0 \times 10^{-6}$ m$^2$/s when measured at 1.5 bar and 300K (as determined for example with sample B114).

In some other embodiments, such collections of adsorbent particles are characterized by beads having an average diameter of about 1.0-1.2 mm and SCRR/$\epsilon_p$ (size compensated relative rate/porosity) values equal to or greater than 4.0 as measured using the Li form of the collection of adsorbent particles when the Li form has equal to or greater than 90% of its exchangeable cations replaced by Li and having average crush strengths of at least 0.9 lbf, and preferably at least 1.0 lbf, (as measured by the single bead crush strength method).

The specified particle size ($d_{particle}$), for the adsorbent particles described throughout this disclosure is the average particle size, as determined for example by the screen analysis (using a series of screens of appropriate mesh sizes) known to those skilled in the art. Thus, while the invention is expected to be suitable for use with adsorbents having diameters in the range of 0.5-3.0 mm, a reference herein to a collection of adsorbent particles having a specified diameter refers to particles within the collection of adsorbent particles distributed over a range of sizes.

As mentioned above, the adsorbent particles of the present invention include a binder. The binder is added in colloidal form during the manufacturing process (e.g., mixing and/or agglomeration stages of the manufacturing process). The percentage of binder used to manufacture adsorbent particles in accordance with the present invention is determined based on the original composition (i.e. the non ion-exchanged form of the adsorbent particle) on a total dry weight basis. More specifically, the binder content used for manufacture can be expressed as: (binder$_{(dry\,wt)}$/(adsorbent$_{(dry\,wt)}$+binder$_{(dry\,wo)}$ × 100). In accordance with the present invention, the percentage of binder used for manufacture is about 15 wt % or less of the original composition (i.e. the non ion exchanged form of the adsorbent particle) on a total dry weight basis, preferably less than or equal to about 10 wt %. In some embodiments, the binder content may be 5-7 wt % of the original composition (i.e. the non ion exchanged form of the adsorbent particle) on a total dry weight basis. Once the amount of desirable binder is selected, the binder is employed in a colloidal form for purposes of manufacture. Utilizing the colloidal binder solutions in accordance with the processes and methods of the present invention allows for well-dispersed and homogeneous distribution of the binder in the adsorbent (e.g., zeolite) particle product form. Consequently, the adsorbent (e.g., zeolites) particles and collections of such particles of the present invention are characterized by high-rate and high crush-strength as described herein.

When the manufacturing process does not include an ion exchange step, the weight percentage of the binder will be approximately the same as that calculated for manufacture. The amount of binder content in the final product adsorbent (e.g., zeolite) particles in accordance with the present invention can vary slightly however when the adsorbent (e.g. zeolite) particles have been subjected to ion exchange. For example and while not to be construed as limiting, when a binder content of 10 wt % is used in a starting NaKLSX material, the binder in the LiLSX form can correspond up to about 11.5 wt %. For a maximum binder content of 15 wt % in the starting material, the binder content in a final LiLSX product can be up to about 17.4 wt % and in a NaLSX product (where the original composition has been ion-exchanged with Na to replace potassium) can be up to about 15.6 wt %. The reason for the change in binder percentage is the difference in unit cell weight of the zeolite starting material and the ion exchanged product. In the last two examples, after ion exchange, the zeolite has a lower unit cell weight than the starting zeolite compared on the same dry basis. As a result, the fraction of binder increases in the product.

When the adsorbent particles are other than the highly-exchanged (i.e., equal to or greater than 90%) Li form (for example, the Na form of the adsorbent such as NaX or NaY), the respective SCRR/$\epsilon_p$ values may be other than at least 4.0. If such collection of adsorbent particles are properly manufactured in accordance with the present invention, however, such collection of particles should have SCRR/$\epsilon_p$ values equal to or greater than 4.0 for adsorbent particles having average particle sizes in the range 0.5-3.0 mm described herein when exchanged to the corresponding highly-exchanged Li form of the collection of adsorbent particles.

Suitable adsorbents include zeolites and more particularly zeolite X having SiO$_2$/Al$_2$O$_3$ ratios in the range 2.5-2.0. Preferred adsorbents include, but are not limited to, low silica zeolite X materials having SiO$_2$/Al$_2$O$_3$ ratios close to 2.0 (i.e. LSX). As used herein, the term "LiLSX" (where LSX=low silica X) means lithium ion exchanged zeolite of type X with a SiO$_2$/Al$_2$O$_3$ ratio of the zeolite being about 2. This material is also referred to as LiLSX. As used herein the term LiX means lithium ion exchanged zeolite X compositions other than LiLSX having SiO$_2$/Al$_2$O$_3$ ratios greater than 2.0 but less than 2.5. As used herein, the term "NaKLSX" (where LSX=low silica X) means zeolite of type X with a SiO$_2$/Al$_2$O$_3$ ratio of about 2 and containing sodium and potassium cations. This product can be obtained from direct synthesis using procedures and methods known by those skilled in the art. "NaLSX" (where LSX=low silica X) means sodium ion exchanged zeolite (for example where the potassium cations in NaKLSX have been ion exchanged for sodium) of type X with a SiO$_2$/Al$_2$O$_3$ ratio of the zeolite about 2. This material is also referred to as NaLSX by those skilled in the art.

The colloidal binder can be selected from the group of silicas. The binder is added during the mixing and/or agglomeration stages of the manufacturing process. These adsorbents can be made by both conventional pan granulation (or pan-pelletization) as well as extrusion-marumerization. After agglomeration the adsorbent particles should be calcined to remove any removable components and set the binding agents. The composition of the adsorbents may be further modified by ion exchange and/or impregnation techniques known by those skilled in the art.

The adsorbent particles (e.g. beads, pellets (i.e. extrudates)) produced using the formulations and/or processing methods described herein possess high adsorption rates and high crush strength compared to similar sized adsorbent particles from traditional forming processes which rely on the use of clay binders. The use of colloidal binders coupled with appropriate mixing protocols, can avoid issues associated with inhomogeneous binder dispersion. In preferred embodiments, adsorbent particles described herein offer crush strengths greater than or equal to 1.0 lbf when the size of the particles is equal to or greater than about 1.0 mm and SCRR/$\epsilon_p$ which rival some of the higher valves achieved by essentially binderless materials produced by caustic digestion (e.g., those described in U.S. Pat. No. 6,425,940 to Chao et al). The spherical nature of the final beaded product as opposed to the pellet shapes produced by extrusion alone, can be beneficial in applications where a high packed density is required and/or where attrition and fluidization are risks.

Beaded adsorbents with high mass transfer rates are valued in many adsorption processes and purifications from the standpoint of increasing the overall process efficiency, and decreasing the cost of producing the target product when combined with appropriate process cycles and equipment in an adsorption system.

Beaded adsorbents with high mass transfer rates are made by a multi-step process beginning with component mixing of adsorbent (e.g., zeolite) with colloidal binder, followed by agglomeration. The term "colloidal" is used herein to mean the homogeneous distribution of silica particles with such particles having diameters in the range of 1-1000 nm in a dispersing substance. The form of the particles can be dense-particulate or branched-polymeric species or mixtures thereof. Suitable agglomeration techniques include, but are not limited to, extrusion-spheronization and pan granulation (or pan-pelletization). The products are then calcined to strengthen the agglomerates, set any binding agents and remove any removable components used during the previous stages. For certain classes of adsorbent, additional processing stages may be required. For example, an ion exchange step can be carried out on the calcined beads to modify their composition as required.

Mixing Stage

The purpose of the mixing stage is to prepare a mixture which is suitable for the selected agglomeration process, typically but not limited to extrusion-spheronization. A second aim of the mixing stage is to blend all of the components together intimately and homogenously. The mixing stage can include a dry mixing stage and a subsequent wet mixing stage or be a component blending (i.e. combined) process step. In one embodiment of the present invention, the adsorbent and processing additives are dry mixed for at least 5-60 minutes, and preferably 5-30 minutes, then colloidal binder and additional water are added for solid-liquid wet mixing to achieve a homogenous final mixture which can be processed by the selected agglomeration method and equipment. In particular, the water content should be adjusted to meet the mixture consistency required by different agglomeration methods (e.g., extrusion-spheronization and pan granulation (or pan-pelletization)). The mixing time for the wet mixing stage should also be at least 5-60 minutes and preferably 5-30 minutes. In a preferred embodiment, processing additives as well as the colloidal binder should be dissolved or dispersed in water and then blended together with the adsorbent component (and any processing additives) in a single step. In this way, a separate dry mixing stage is eliminated and replaced by a single wet-mixing operation. As above, at least 5-60 minutes, and preferably 5-30 minutes, mixing time is recommended for this single-stage wet mixing process to ensure high dispersion of the components within the mixture.

The amount of colloidal binder can be up to about 15 wt % or less of the original composition (i.e. the non ion exchanged form of the adsorbent) on a total dry weight basis, preferably less than or equal to about 10 wt %. As mentioned above, the binder is added in colloidal form during the manufacturing process (e.g., mixing and/or agglomeration stages of the manufacturing process). The percentage of binder used to manufacture adsorbents in accordance with the present invention is determined based on the original composition (i.e. the non ion-exchanged form of the adsorbent) on a total dry weight basis. More specifically, the binder content used for manufacture can be expressed as: $(\text{binder}_{(dry\ wt)}/(\text{adsorbent}_{(dry\ wt)} + \text{binder}_{(dry\ wt)}) \times 100)$. Suitable colloidal binders include the group of silica binders. Organic binders such as PEG (poly-ethylene glycol), PVA (poly-vinyl alcohol), methylcellulose and its derivatives, and acrylic emulsions can be added at 0.5-5 wt % to help the agglomeration process, and in particular the extrusion process.

The amount of water should be adjusted on a case by case basis, since the water content appears to play a role in the formation of pores, especially macropores within the agglomerated product. Moreover, different forming equipment has specific requirements for the consistency of the formulation. Hence, the water content should be regulated for a given formulation to obtain mixtures which can be processed by the intended bead-forming equipment and ultimately yield an agglomerated product with good mass transfer characteristics and adequate crush strength. The water quality is not limiting, provided no detrimental impurities or contaminants are introduced which would affect the adsorbent, the colloidal binder or any additives in a negative way.

Extrusion

Once a suitable mixture has been prepared from the mixing stage, this should be processed by extrusion to form pellets or strands of the adsorbent mixture. Extrusion dies between 0.5-3 mm are recommended and more preferably between 1-2 mm. Depending on the formulation, high or low pressure extrusion can be used, although low pressure extrusion could be preferred in the context of producing products with good porosity and mass transfer characteristics. Generally, maximum mass transfer characteristics are essentially set after the extrusion stage and further processing, including spheronization using a marumerizer, often has the effect of increasing the mass transfer resistance of the agglomerated particles. Hence, from the perspective of achieving beaded particles with high mass transfer rates, extrudates with high mass transfer rates must be produced first. In some embodiments, low pressure extrusion can provide high rate extrudates (at a given particle diameter) without a reliance on the use of additives by virtue of its capability to produce extrudates with high porosity. The success of the extrusion phase can be gauged by characterizing the porosity using a technique such as Hg porosimetry (see, for example, *Handbook of Porous Solids*, pp. 309-50 (Ferdi Schuth et al., eds., Wiley Verlag GmbH 2002) or by performing adsorption rate tests using an appropriate method such as the breakthrough test described below and in U.S. Pat. No. 6,425,940 B1 to Chao et al or U.S. Pat. No. 6,790,260 B2 to Ackley et al (see also, U.S. Pat. Nos. 6,500,234 B1 to Ackley et al and 6,444,014 B1 to Mullhaupt et al). U.S. Pat. No. 6,425,940 B1; U.S. Pat. No. 6,790,260 B2; U.S. Pat. No. 6,500,234 B1; and U.S. Pat. No. 6,444,014 B1 are incorporated herein by reference in their entirety Such test is also described hereinbelow. In some embodiments, desirable porosities are in the range of about 35-52%, and may preferably be about 38-45%, of the adsorbent particle in its final form or after the calcination step. The extrusion method, high or low pressure should be selected to yield products, in final form or after calcination which achieve porosities within the above desirable ranges. The mass transfer properties of the extruded product need to be greater than or equal to 100% of the target mass transfer rates for the spheronized product.

Spheronization

The products from extrusion (still in their green/uncalcined state) should be converted to beads by appropriate equipment, for example, equipment that can chop and roll the extrudates so as to round them into a beaded form. The term "beads" is used herein to mean products that are more spherical and bead-like compared to the extrudate. Depending on the formulation, spheronization process and operating parameters, different degrees of roundness can be achieved. In terms of the high rate adsorbents of the present invention, the shape is less limiting than the ability to load and pack adsorption columns and achieve reasonable dense packing (i.e., at least 0.35 g/cc). An example of suitable equipment for chopping and rounding of extrudates is a marumerizer (e.g., the LCI Corporation marumerizer model no. QJ-400TG or model no. QJ-700T). For the present invention, any equipment capable of chopping and rounding the extruded material may be employed. For some formulations, excessive spheronization can be detrimental to the adsorbent performance, as well as the product yields from this processing step.

In the case of a marumerizer, operating parameters (e.g., batch size, rotation speed and processing time) need to be optimized on a case by case basis. Higher speeds (i.e., greater than 1000 rpm) and longer times (i.e., greater than 90 seconds) often promote a greater degree of rounding, but not all formulations can be processed this way. Important parameters that impact the marumerizer operation can include the adsorbent composition and binder, the moisture content, presence of additives and the quality of the extrudate feed. For a given adsorbent, different binders at the same binder content can augment or contract the range of marumerizer speeds and times which can be used. If the extrudate feed is too wet, agglomeration can take place within the marumerizer which will increase the particle size of the product, compared to drier formulations. On the other hand, extrudates that are too dry risk attrition inside a marumerizer and yield losses through the generation of fines. An embodiment of the present invention employs a high moisture content to facilitate the extrusion step and obtain good quality and highly porous extrudates and uses an additional step to dry the surface of the particles prior to marumerizing to prevent excessive agglomeration. The method used to dry the particle surfaces prior to marumerization is not limiting and can be carried out in a number of ways, including the use of a dry purge with a suitable gas depending on the composition of the adsorbent. It is preferable that adsorbent formulations are used which are compatible with the extrusion and spheronization stages without additional processing steps or aids. In this way, the products from extrusion can be directly spheronized and, once calcined, produce adsorbent particles with high rate and high crush strength characteristics.

Calcination

Once the extrusion product has been spheronized and the green (i.e., uncalcined) beaded product harvested, a calcination step should be performed to set any binders and/or remove any processing aids if used, and generally to strengthen the agglomerated products. More specifically, calcination allows the "green" adsorbent particles to be made strong by a thermal treatment at temperatures up to about 600° C. During calcination volatile components including processing aids or additives are substantially removed and the binder reacts, sinters or fuses together with itself and/or with the zeolite to create a strong particle meeting the crush strength criteria described in this invention. If processing aids containing organic components have been used, then the purge gas should be air. For other formulations either air or other inert gases are acceptable. Care must be taken during calcinations to avoid steaming the sample. This is well known to those skilled in the art and this can be avoided by staging the temperature rise and using a dry purge gas such as dry air to sweep away moisture. The final temperature should be that which successfully completes the objectives of the calcination process as specified above. For inorganic adsorbents such as zeolites agglomerated with the colloidal binders described herein, temperatures approaching or equal to 600° C. are recommended.

Additional Processing Steps

Additional processing steps may be required to produce some adsorbent classes. For example, to produce lithium zeolite X compositions (LiX or LiLSX) that are useful for non-cryogenic air separation, an ion exchange step is typically performed using a column-based process once beads of the as-synthesized zeolite X have been made and calcined. The present invention describes a process by which LiX or LiLSX zeolites can be made by ion exchanging the calcined beads with lithium following known procedures.

The degree of ion exchange is expressed as a ratio between the number of Li cations and number of aluminum atoms of the adsorbent (e.g., zeolite) present in tetrahedral positions. The degree of ion exchange is preferably at least 90% (i.e. highly-exchanged), and more preferably, the degree of ion exchange is at least 95%.

Activation in accordance with the present invention is a process by which primarily water occluded into the adsorbent particles during any post calcination treatments or steps (for instance the ion exchange step), is removed by thermal treatment up to about 600° C. The water content of the final product as measured for instance by a Karl Fischer titration method known by those skilled in the art should be less than about 1 wt % and preferably less than or equal to about 0.5 wt %.

As mentioned above, low silica zeolite X materials having $SiO_2/Al_2O_3$ ratios close to 2.0 (i.e. LSX) are known in the art (see for example, U.S. Pat. Nos. 7,300,899 B2 to Weston et al. and 6,649,556 B2 to Masini et al). The present invention is illustrated by the following examples, which show that samples of NaKLSX zeolite particles made with the colloidal binders and agglomeration processing of the subject invention described herein, represent improvements over like samples made with traditional (non-colloidal) un-purified clay binders (i.e. bentonite). Adsorption rate data is presented for these samples after Li-ion exchange and activation steps to illustrate that the products are high performance materials. In addition, single bead crush strength measurements have been performed to demonstrate that the improvements in adsorption rate have not come at the expense of physically weaker samples.

In addition, the effective pore diffusivity (i.e., effective macropore diffusivity or intrinsic diffusivity) at 1.5 bar and 300 K for comparative example 6a (i.e., sample B5M-2) was determined to be $2.4 \times 10^{-6}$ m$^2$/s and for sample B114 (in Example 1) to be $4.2 \times 10^{-6}$ m$^2$/s. According to Ackley U.S. Pat. Nos. 6,500,234 and 6,790,260 the effective pore diffusivity or intrinsic diffusivity is the transport property that is due to the intrinsic characteristics of the adsorbent particle including but not limited to structure, size, shape and length of the macropores. The effective pore diffusivity ($D_p$) is calculated using the method and at 1.5 bar and 300 K described in U.S. Pat. Nos. 6,500,234 and 6,790,260.

In the following examples, the SCRR values were determined by using a breakthrough test. Such test can be carried out on equipment as shown in FIG. 11.

By the terms "sorption rate", or "adsorption rate" or "rate", it is meant the rate at which the adsorbate loading changes in a given time period in a collection of particles for a given adsorption separation process. This sorption rate is approximately proportional to the inverse of (particle diameter)$^2$ and is directly proportional to the "intrinsic sorption rate" (also referred to as the "intrinsic rate" or "intrinsic diffusion rate"). By the term "intrinsic rate", it is meant that component of the sorption rate that is due to the intrinsic properties of an adsorbent particle including, but not limited to, macropore diameter, macropore shape, macropore volume, macropore distribution and the way macropores are connected to each other within a particle. The intrinsic rate of a material is independent of particle size. The term "relative rate" is a comparative measure of "sorption rate" and the term "size-compensated relative rate" (SCRR) is a measure of the intrinsic sorption rate.

In particular, SCRR is defined as:

$$SCRR(p) = RR(p) * [d_{particle}]^2 \quad (1)$$

where $d_{particle}$ is the average diameter derived from the particle size distribution, p total pressure of the system, typically set at 150 kPa, and RR is Relative Rate which in turn is defined as:

$$RR(p) = [\Delta N_2(Y_F, Y_O)]/(t_2 - t_1) \quad (2)$$

wherein $\Delta N_2$ (the nitrogen loading from $Y_o$ to $Y_F$) can be determined from a mass balance analysis of the breakthrough test (see below) or alternatively from adsorption isotherms recorded at the same temperature used in the breakthrough test. (p) in equation (2) is the total pressure of the system as in equation (1). Y generally is the composition of the stream defined in mole fraction of oxygen (note, for purposes of calculation, the mole fraction of nitrogen=1−mole fraction of oxygen). t generally is time. $Y_F$ is composition of feed which has a mole fraction of oxygen equal to 0.209, $Y_O$ is composition of regeneration gas which has a mole fraction of oxygen equal to 0.9999, $t_2$ is the time when the mole fraction of oxygen, $Y_2$ is equal to 0.3, and $t_1$ is the time when the mole fraction of oxygen, $Y_1$ is equal to 0.9. The units for SCRR are (mmol mm$^2$)/(g s).

For the process of air separation, the breakthrough test is performed in two steps in which the flow rate, pressure and temperature of the feed gas are the same in both steps. With reference to FIG. 11, this process will be described. The first step involves saturation of the adsorbent bed 1 with $O_2$, the less selective component for oxygen and nitrogen, provided via flow meter 2 and line 3. In the second step, air or a synthetic air mixture containing $N_2$ and $O_2$ is then introduced to bed 1 via flow meter 4 and line 3. Valve 6 operates in conjunction with flow meter 2 such that pressure of the air or synthetic air is maintained in an external loop until the four port valve 7 connects the air/synthetic air feed to line 3 such that the air/synthetic air flows into bed 1. The pressure, temperature and composition of the feed mixture in the second step should be representative of that in an adsorption step of an actual process, e.g. 150 kPa, 300° K. and feed air composition. The molar flux was approximately 10 mol/m$^2$ s, although this flux may be varied as required. The pressure is maintained substantially constant in the bed 1 by using a control valve 8 located on the downstream side of the adsorbent bed. The endspace and connecting piping volumes (dead volumes) are designed to be 5% or less than that of the adsorbent bed volume (for example, approximately 20 cm$^3$).

The flow rate and concentration of $O_2$ are continuously and accurately monitored throughout step two via flow meter 9 and oxygen analyzer 10 until the breakthrough of $N_2$ is complete. Flow to analyzer 10 is maintained at a fixed amount via fixed valve 5. In step two, the more selectively adsorbed $N_2$ displaces the adsorbed $O_2$ already in the bed 1. As the bed nears saturation with the air mixture, the breakthrough of $N_2$ is reflected in a decrease in the $O_2$ concentration and an increase in overall flow rate of the effluent from the bed. The piping and adsorbent bed are maintained at the same temperature as the feed by immersing them in a thermostat bath controlled at the same temperature as the feed. The relative rate and SCRR are determined from the results of this test once $\Delta N_2$ is determined. The differential loading (appearing in equation 2 above) $\Delta N_2$ is determined from a mass balance analysis of the breakthrough results ($\Delta N_2$=moles of $N_2$ in−moles of $N_2$ out). In practice, this can be determined from equation (3) below. Q generally is the flow rate and in equation (3), $Q_f$ is the feed flow rate and $Q_i$ is the outlet flow rate, $Y_{N2}$ is $N_2$ concentration in moles (f and i denote feed and outlet respectively) and $\Delta t$ is the experiment time. The integration is performed over the entire test time (0 to te where te denotes end time, i.e. where at time 0 and $Y_O$=0.9999 and where te is time at the end of the test when $Y_F$=0.209).

$$\Delta N_2 = Q_f(Y_{N2})_f \Delta t - \int_0^{te} Q_i(Y_{N2})_i \, \partial t \quad (3)$$

The $t_2-t_1$ in equation (2) is determined directly from the oxygen concentration front measured at the exit of the test bed (using oxygen analyzer 10). The relative rate calculated from equation 2 is used in equation 1 with the particle size information to determine SCRR.

See also, U.S. Pat. No. 6,425,940 B1 to Chao et al; U.S. Pat. No. 6,790,260 B2 to Ackley et al; U.S. Pat. No. 6,500,234 B1 to Ackley et al and U.S. Pat. No. 6,444,014 B1 to Mullhaupt et al.

Sample Preparation Li LSX Compositions

The loss on ignition (LOI) signifies the percentage of removable components present in a specified component or formulation and can be determined using methods known in the art, typically in the current application, the LOI value is determined based on the percent weight change (or loss) upon heating the material in air up to 1000° C. for at least 1 hour. The LOI in Table 1 is specifically determined for the complete formulation prior to agglomeration. The value signifies the percentage of removable components present in the final formulation expressed on a total wet weight basis.

EXAMPLE 1

Preparation of LiLSX Beads (10 wt % Colloidal $SiO_2$ Binder, 43.7-45.8 wt % $H_2O$ Plus Other Combustibles)—Samples B77 and B114 (Table 1 and FIG. 1)

The raw materials for this preparation include NaKLSX as synthesized powder (LSX where LSX=low silica X) which was obtained from Zeochem LLC, and methylcellulose used as an extrusion aid (product name Methocel® K4M from Dow Chemicals). Ludox® LS-30 and AS-30 are colloidal silica products of Dupont, distributed by Sigma Aldrich. 854 g LSX powder (having a LOI=18 wt %) was blended with 1.5 wt % Methocel® K4M in a Hobart N50 mixer for 60 minutes. The dry mixed powder was slowly wetted with 10 wt % $SiO_2$ binder in a dispersed colloidal form, such as 259.3 g LS-30 (the number "30" indicates the silica concentration of $SiO_2$ to be about 30%). Polyethylene glycol (PEG) (Polyethylene Glycol 6000 (PEG 6000) from Alfa Aesar) employed as an organic binder/lubricating additive was dissolved in additional de-ionized water then added to the mixture whilst stirring in the Hobart N50 mixer. For batch B77, 17.1 g of PEG was dissolved in 305 g water; for batch B114, only 4.2 g of PEG as well as 266 g water were added into the mixture. A total mixing time of 30-60 minutes was used for the wet mixing stage. The sequence of addition is shown in FIG. 1. It is noteworthy that whilst this order was followed throughout the examples presented herein, the colloidal binder and additive components can be added simultaneously, if required.

The wet mixed product was immediately extruded using a low pressure multi-granulator (extruder) in dome geometry from LCI Corporation (Model No. MG-55). The extrudates were collected, divided in sub-batches, each weighing around 250-300 g (wet weight) and marumerized using a laboratory marumerizer (spheronizer) from LCI Corporation (Model No. QJ-230T). The LCI QJ-230T was equipped with a dry air supply fed through the sample inlet port to provide some in situ sample drying. The first extrudate batch (B77) was quite wet and was therefore air-dried in fume-hood for 20 minutes before marumerization. Both batches (B114 and B77) were marumerized at 1000 rpm for 30 seconds before the sample was harvested. The two samples were then calcined in dry air to set the binder and remove the combustible additives. A shallow tray calcination method was used in a General Signal Company Blue M Electric oven equipped with a dry air purge. The adsorbents were spread out in stainless steel mesh trays to provide a thin layer less than 0.5 inch deep. A purge of 200 scfh of dry air was fed to the oven during calcinations. The temperature was set to 90° C. followed by 360 minutes of dwell time. The temperature was then increased to 200° C. gradually over the course of a 360 minute period (approximate ramp rate=0.31° C./min), and then further increased to 300° C. over a 120 minute period (approximate ramp rate=0.83° C./min) and finally increased to 593° C. over a 180 minute period (approximate ramp rate=1.63° C./min) and held there for 45 minutes before cooling.

The extrudate and beaded products B77 and B114 were harvested and subjected to lithium ion exchange. A column ion exchange process was used where the samples (after careful rehydration to around 20 wt % moisture as determined by loss on ignition (LOI) measurements) are packed inside a glass column (dimensions: 3 inches i.d.) contacted with lithium chloride solution (1.0 M) at 90° C. at a flow rate of 15 ml/min. A preheating zone before the adsorbent packed column, ensures the solution temperature has reached the target value prior to contacting the zeolite samples. A 12 fold excess of solution was contacted with the samples to yield products with Li contents of at least 96% exchange and above. After the required amount of solution is pumped through the column containing the samples, the feed is switched to de-ionized water to remove excess LiCl from the samples. A water volume of 30 L and flow rate of 120 ml/min was used. A silver nitrate ($AgNO_3$) test was used to verify that the effluent was essentially chloride free at the end of the washing stage.

The wet samples were dried and activated under dry $N_2$ purge (flow rate 200 scfh) using the shallow tray activation method described above in a General Signal Company Blue M electric oven. The adsorbents were spread out in stainless steel mesh trays to provide a thin layer less than 0.5 inch deep. The temperature was set to 90° C. followed by 360 minutes dwell time. The temperature was then increased to 200° C. gradually over the course of a 360 minute period (approximate ramp rate=0.31° C./min), and then further increased to 300° C. over a 120 minute period (approximate ramp rate=0.83° C./min) and finally increased to 593° C. over a 180 minute period (approximate ramp rate=1.63° C./min) and held there for 45 minutes before cooling.

The beaded products were harvested and subjected to adsorption rate tests, which were performed using a breakthrough method as described hereinabove to determined the size compensated relative rate (SCRR see equation 1). The same breakthrough test and associated apparatus was used to determine SCRR for all the other examples (examples 2-10, including comparative examples). The equipment and test protocol have been described hereinabove. Prior to adsorption testing, the marumerized samples were screened to 10 by 20 mesh sizes. The experimental conditions for the breakthrough test are described below and were used throughout all the examples using the equipment described in FIG. 11. A U-shape stainless steel column (9.4 mm i.d., typically 20.2 ml internal volume) is tightly packed with activated adsorbent particles inside a glove box purged with dry $N_2$ controlled gas. The bed is then connected to the testing system described above and immersed in a thermostatically bath set to the same temperature as the feed gases, 300° K. A breakthrough test is performed in two steps in which the flow rate (1000 ml/min), pressure (150 kPa) and temperature (300° K.) of the feed gases are maintained constant as far as possible (i.e. within equipment limitations) in both steps. The first step involves saturation of the adsorbent bed with pure $O_2$ (99.99%), the less selective component, for a total of at least 3 minutes. In the second step, dry air (consisting around 20.9% $O_2$) is passed through the adsorbent bed for at least another 3 minutes, and the more selectively adsorbed $N_2$ adsorbs in the bed and displaces the previously adsorbed $O_2$. High purity $O_2$ is produced until $N_2$ breakthrough is achieved. The flow rate and concentration of $O_2$ are continuously and accurately monitored throughout the two steps by a downstream flow meter (Model 0-2 LPM from Phase 1) and $O_2$ analyzer (Model Servomex 733). The 3 minutes duration for each step has been verified for all the tests described herein as being sufficient to allow the effluent gas composition to reach that of the feed.

The $\Delta N_2$ loading is calculated by performing a mass balance analysis of the breakthrough data using equation 3 above. The mass transfer time ($t_2-t_1$ see equation 2) was determined at the time duration between $O_2$ concentration of 0.3 to 0.9% as measured by the $O_2$ analyzer. Relative rate is then determined by dividing $N_2$ loading with mass transfer time following equation 2 above.

After the breakthrough test, the adsorbent bed is removed from the system and subjected to an empirical screen analysis, for measurement of the particle size distribution and subsequent calculation of the average particle size ($d_{particle}$). The adsorbent particles are passed through a series of screens with mesh sizes in the range 10 by 20 ordered in increments of 2 mesh. The weight of adsorbent particles captured on each screen is measured and the average particle size is calculated as a mathematical mean of the percent by weight of adsorbent particles remaining on a given screen multiplied by the average size represented by that screen interval (i.e. for particles passing through the 10 mesh opening (size=2.0 mm) and remaining on the 12 mesh screen (opening=1.68 mm) an average size between the 10 and 12 mesh interval is used (i.e. 1.84 mm)). The Size Compensated Relative Rate (SCRR) is then calculated from equation 1 above.

SCRR values presented in the form SCRR/$\epsilon_p$ determined from the breakthrough test are summarized below in Table 1 and shown together with the agglomeration and processing steps in FIG. 1. The results of the breakthrough experiment are presented in the form SCRR/$\epsilon_p$, where SCRR is the size compensated relative rate, as defined in equation 1 and $\epsilon_p$ is the porosity of the adsorbent particles obtained from Hg porosimetry. The use of SCRR/$\epsilon_p$ rather than SCRR alone as a measure of rate is to make some provision for the non-selective void space within the adsorbent particles. Designing new adsorbents particles which are characterized by high SCRR/$\epsilon_p$ will ensure that apparent rate increases are not due to lower gas storage (by a packed bed of adsorbent particles) brought on by increased void space within the adsorbent beads.

Crush strength data is also presented to illustrate that the adsorbents of the present invention are both high rate and high strength materials. The crush strength measurements were performed on essentially dry samples (i.e., moisture content less than 1 wt %). In each case, the samples were screened to 12×14 mesh size and 25 beads were selected at random. These were loaded one by one onto the sample stage of a Lloyd LRX Compression Tester equipped with a 0-50 N load cell. The individual beads were crushed using a piston speed of 0.5 inches/minute. The crush strength reported in Table 1 represents the average obtained for 25 beads of a given sample.

Comparing the SCRR/$\epsilon_p$ values in Table 1 of this application with LSX zeolites prepared by caustic digestion methods such as the essentially binderless adsorbents as disclosed in U.S. Pat. No. 6,425,940 (where the values of SCRR therein were divided by the respective porosities, $\epsilon_p$, to calculate SCRR/$\epsilon_p$) the range of SCRR/$\epsilon_p$ values of at least 4 in the present application compare favorably with the range of SCRR/$\epsilon_p$ achieved by Chao et al (i.e. 2.3-6.8, for the samples after caustic digestion in Table 1 of U.S. Pat. No. 6,425,940 where both SCRR and porosity ($\epsilon_p$) are given to permit calculation of SCRR/$\epsilon_p$). Despite the fact that the adsorbents described in this example were formed using a binder content of 10 wt %, these compare very favorably with the essentially binderless materials from U.S. Pat. No. 6,425,940 prepared by the caustic digestion route.

In addition, the effective pore diffusivity for sample B114 was determined as discussed above (and as described in U.S. Pat. Nos. 6,500,234 and 6,790,260) and determined to be $4.2 \times 10^{-6}$ m$^2$/s at 1.5 bar and 300 K as described.

EXAMPLE 2

Preparation of LiLSX Beads (10 wt % Other Colloidal SiO$_2$ Binder, 42.9-43.2 wt % H$_2$O Plus Other Combustibles)—Samples B136 and B142 (Table 1 and FIG. 2)

654 g of LSX powder from Zeochem LLC (and having a LOI value=16.5 wt %) was dry mixed with 8.2 g of Methocel® K4M using a Hobart N50 mixer for 60 minutes. 101 g of colloidal SiO$_2$, either Ludox® AS-30 (Sigma-Aldrich) or Aesar dispersed silica (Johnson Matthey), was added into the dry mixture. 300 g of de-ionized water was added for batch B142 (Ludox® AS-30 binder) while 305 g water was added for batch B136 (Aesar SiO$_2$ binder), whilst stirring in the Hobart N50 mixer, both without PEG additive. A total mixing time of 30-60 minutes was used for the wet mixing stage. The wet mixed product was extruded as above (see Example 1), using the MG-55 granulator from LCI Corporation in dome geometry. The majority of extrudates were divided into 4-5 sub-batches of 250 g each and directly marumerized using the QJ-230T Laboratory Marumerizer (Spheronizer) from LCI Corporation, without an air-drying lead time or an air purge through the sample inlet port of the marumerizer. Both batches (B142 and B136) were marumerized at a speed of 1000 rpm for 30 seconds. The beaded products were harvested, calcined and subsequently ion exchanged with lithium and activated following the procedure described in Example 1.

From Table 1, it can be seen that both these other colloidal SiO$_2$ binders possess high N$_2$ adsorption rate as expressed in terms of SCRR/$\epsilon_p$, however the crush strength for LiLSX beads are somewhat weaker than products made using Ludox® LS-30 at similar water contents.

EXAMPLE 3

Preparation of LiLSX Beads (7 wt % Colloidal SiO$_2$ Binder, 42.7 wt % H$_2$O Plus Other Combustibles)—Sample B125 (Table 1 and FIG. 1)

838 g of LSX powder from Zeochem LLC (and having a LOI value=16.5 wt %) was dry mixed with 10.5 g of Methocel® K4M using a Hobart N50 mixer for 60 minutes. 175.7 g of colloidal SiO$_2$, Ludox® LS-30, was added into the dry mixture. 290 g of de-ionized water, without PEG additive, was added whilst stirring in the Hobart N50 mixer. A total mixing time of 30-60 minutes was used for the wet mixing stage. The wet mixed product was extruded as above (see Example 1) using the MG-55 granulator from LCI Corporation in dome geometry. The majority of extrudates were divided into 4-5 sub-batches of 250 g each and directly marumerized using the QJ-230T Laboratory Marumerizer (Spheronizer) from LCI Corporation, without an air-drying lead time or an air purge through the sample inlet port of the marumerizer. Batch B125 was marumerized at a speed of 800 rpm for 30 seconds. The beaded products were harvested, calcined and subsequently lithium exchanged and activated following the procedure described in Example 1.

The data in Table 1 shows that less colloidal SiO$_2$ binder does not necessarily translate into higher N$_2$ adsorption rate, if mixing conditions, or the water content and/or additive amounts (such as polyethylene glycol etc.) are not fine-tuned correctly; note the strength for B125 LiLSX beads is reduced compared to B114 in Example 1.

EXAMPLE 4

Preparation of LiLSX Beads (7 wt % Tetramethylorthosilicate as SiO$_2$ Binder, 48.7 wt % H$_2$O Plus Other Combustibles)—Sample B133 (Table 1 and FIG. 2)

620 g of LSX powder from Zeochem LLC (and having a LOI value=16.5 wt %) was dry mixed with 7.8 g of Methocel® K4M using a Hobart N50 mixer for 60 minutes. 98.7 g of tetramethylorthosilicate (TMOS, 39.5% SiO$_2$) was added, as well as 359 g de-ionized water into the dry mixture whilst stirring in the Hobart N50 mixer. A total mixing time of 30-60 minutes was used for the wet mixing stage. The wet mixed product was extruded as above (see Example 1) using the MG-55 granulator from LCI Corporation in dome geometry. The majority of extrudates were divided into 4-5 sub-batches of 250 g each and directly marumerized using the QJ-230T Laboratory Marumerizer (Spheronizer) from LCI Corporation, without an air-drying lead time or an air purge through the sample inlet port of the marumerizer. Batch B133 was marumerized first at a speed of 1000 rpm for 10 seconds, followed by 800 rpm for another 20 seconds. The beaded products were harvested, calcined and subsequently ion exchanged with lithium and activated following the procedure described in Example 1. The data in Table 1 shows that TMOS as the sole SiO$_2$ binder yielded LiLSX materials with inferior crush strength, with the measured values being as low as 0.54 lbf.

COMPARATIVE EXAMPLE 5

Preparation of LiLSX Beads (10 wt % Catapal® B Al$_2$O$_3$ Binder, 48.3 wt % H$_2$O Plus Other Combustibles)—Sample B67 (Table 1 and FIG. 3)

900 g of LSX powder from Zeochem LLC (and having a LOI value=18.0 wt %) was dry mixed with 18 g of Methocel® K4M using a Hobart N50 mixer for 60 minutes. Meanwhile, 143 g Catapal® B Al$_2$O$_3$ binder obtained from Sasol with a LOI value of 29 wt %, was peptized with 27 g acetic acid and 76 g de-ionized water. The above components were mixed with 27 g PEG and 456 g additional de-ionized water in the Hobart N50 mixer. A total mixing time of 30-60 minutes was used for the wet mixing stage. The wet mixed product was extruded as above (see Example 1) using an LCI basket granulator. The majority of extrudates were divided into 4-5 sub-batches of 250 g each and directly marumerized using the QJ-230T Laboratory Marumerizer (Spheronizer) from LCI Corporation, without an air-drying lead time or an air purge through the sample inlet port at marumerizer. Batch B67 was marumerized subsequently at a speed of 700 rpm for 30 seconds, and 900 rpm for 30 seconds, followed by 1100 rpm for the final 30 seconds. The beaded products were harvested, calcined and subsequently ion exchanged with lithium and activated following the procedure described in Example 1.

It should be noted, however, that Catapal® B $Al_2O_3$ binder is not a colloidal binder. Efforts made to make the binder more colloidal in nature by peptizing with the acetic acid appear to have been only partially successful.

From Table 1, it can be seen that the $Al_2O_3$ bound LiLSX materials show significantly higher crush strength; however, the $N_2$ adsorption rate expressed in the form SCRR/$\epsilon_p$ was much lower than the essentially binderless adsorbents disclosed in U.S. Pat. No. 6,425,940 (where the values of SCRR therein were divided by the respective porosities, $\epsilon_p$ to calculate SCRR/$\epsilon_p$ for the samples after caustic digestion in Table 1 of U.S. Pat. No. 6,425,940 where both SCRR and porosity ($\epsilon_p$) are given to permit calculation of SCRR/$\epsilon_p$) wherein values in the range 2.3 to 6.8 were achieved.

COMPARATIVE EXAMPLES 6a-6c

Preparation of LiLSX Beads Samples B100, B70, B5M-2 (Table 1 and FIG. 3)

EXAMPLE 6a

Preparation of LiLSX Beads (10 wt % Actigel Clay Binder, 48.3 wt % $H_2O$ Plus Other Combustibles)—Sample B 5M-2 (Table 1)

821.6 g of zeolite LSX powder from Zeochem LLC (LOI value=14.8 wt %) was dry mixed with 100.7 g Acti-Gel 208 (referred herein as Actigel, a purified attapulgite clay binder) from Active Minerals Company LLC (LOI value=22.7 wt %) and 10.5 g Methocel® K4M from Dow Chemicals in a Hobart N50 mixer for 90 minutes. 500 g of such dry-mixed powder having an starting LOI value of 16.6 wt % was slowly wetted with 306 g of de-ionized water whilst stirring in the Hobart N50 mixer. A total mixing time of 60 minutes was used for the wet mixing stage. The wet mixed product having an LOI value of 48.3 wt % was immediately extruded using a low pressure Multi Granulator (Extruder) in dome geometry from LCI corporation (model no. MG-55) using a 2.0 mm die. The extrudates were air-dried under room temperature for 60 minutes. 250 g of such extrudates were marumerized using a Laboratory Marumerizer (Spheronizer) QJ-230T from LCI Corporation at 1000 rpm for 30 seconds. The beaded products denoted B5M-2 were harvested and calcined, and subsequently ion exchanged with lithium and activated following the procedure described in Example 1 of this application.

In addition, the effective pore diffusivity for comparative example 6a (i.e., B5M-2) was determined using the methods discussed above and determined to be $2.4 \times 10^{-6}$ m$^2$/s at 1.5 bar and 300 K.

EXAMPLE 6b

Preparation of LiLSX Beads (10 wt % Actigel Clay Binder, 45.8 wt % $H_2O$ Plus Other Combustibles)—Sample B70 (Table 1 and FIG. 3)

854.0 g of zeolite LSX powder from Zeochem LLC (LOC value=18.0 wt %) was dry mixed with 101.0 g Actigel (LOI value=22.8 wt %) and 10.5 g of Methocel® K4M using a Hobart N50 mixer for 60 minutes. 19.3 g of polyethylene glycol 6000 (PEG, from Alfa Aesar) was dissolved in 451 g of de-ionized water and the solution so formed was used to wet the dry mixed components, whilst stirring in the Hobart N50 mixer. A total mixing time of 60 minutes was used for the wet mixing stage. The wet mixed product having an LOI of 45.8 wt % was extruded as above (see Example 1) using the MG-55 granulator from LCI Corporation in dome geometry using a 2.0 mm die. 250.0 g of extrudates were marumerized at 1000 rpm for 30 seconds using a QJ-230T Laboratory Marumerizer (Spheronizer) from LCI Corporation. The beaded products denoted B70 were harvested and calcined, and subsequently ion exchanged with lithium and activated following the procedure described in Example 1 of this application.

EXAMPLE 6c

Preparation of LiLSX Beads (10 wt % Bentonite Clay Binder, 45.1 wt % $H_2O$ Plus Other Combustibles)—Sample B100 (Table 1 and FIG. 3)

854.0 g of zeolite LSX powder from Zeochem LLC (LOI value=18.0 wt %) was dry mixed with 89.3 g Bentonite (a clay binder, purified grade from Fisher Chemicals with LOI value=12.9 wt %) and 10.5 g Methocel® K4M. The three components were dry mixed using a Hobart N50 mixer for 60 minutes. 482 g of de-ionized water was used to wet the dry mixed powder whilst stirring in the Hobart N50 mixer. A total mixing time of 60 minutes was used for the wet mixing stage. The wet mixed product having an LOI of 45.1 wt % was extruded as above using the MG-55 granulator from LCI Corporation in axial geometry using a 2.0 mm die. 250.0 g of extrudates were marumerized directly at 1000 rpm for 30 seconds using a QJ-230T Laboratory Marumerizer (Spheronizer) from LCI Corporation, without an air purge through the sample inlet port (see Example 1). The beaded products denoted B100 were harvested and calcined, and subsequently ion exchanged with lithium and activated following the procedure described in Example 1 of this application.

Samples B70, B100 and B5M-2 were prepared following the procedure outlined in U.S. Provisional Patent Application No. 60/853,154 filed on Oct. 20, 2006, now PCT application No. PCT/US2007/082087, the contents of both of which are incorporated herein in their entirety). Similar performance tests have been performed on these reference samples and included in Table 1.

From Table 1, it can be seen that the bentonite clay-bound LiLSX material (B100) possesses a high crush strength compared to comparative sample B70, bound by Actigel, a purified attapulgite clay binder. However the $N_2$ adsorption rate of the sample containing the bentonite clay binder, expressed in terms of SCRR/$\epsilon_p$ was lower than the Actigel and colloidal silica bound products.

EXAMPLE 7

Preparation of LiLSX Small Beads (10 wt % Colloidal $SiO_2$ Binder, 43.5 wt % $H_2O$ Plus Other Combustibles)—Samples B177 and B257 (Table 1 and FIG. 4)

846 g of LSX powder from Zeochem LLC (and having a LOI value=17.3 wt %) was dry mixed with 10.5 g of Methocel® K4M using a Hobart N50 mixer for 60 minutes. 259.3 g of Ludox® LS-30 (Sigma-Aldrich) colloidal $SiO_2$, together with 14 g PEG (Polyethylene Glycol 6000 (PEG 6000) from Alfa Aesar dissolved in 245 g of de-ionized water, were added into the mixture whilst stirring in the Hobart N50 mixer. A total mixing time of 30-60 minutes was used for the wet mixing stage. The wet mixed product was extruded as above (see Example 1), using the MG-55 granulator from LCI Corporation in dome geometry with die size as small as 1.2 mm. The majority of extrudates were divided into 4-5 sub-batches of 250 g each and directly marumerized using the QJ-230T Laboratory Marumerizer (Spheronizer) from LCI Corporation, without an air-drying lead time or an air purge through the sample inlet port of the marumerizer. Sample batch B177 was marumerized at a speed of 1000 rpm for 30 seconds. The beaded products were harvested, calcined and subsequently ion exchanged with lithium and activated following the procedure described in Example 1.

For sample B257, significant less mixing time was adopted for both the dry and wet mixing stages: 877 g of LSX powder from Zeochem LLC (and having a LOI value=20.2 wt %) was dry mixed with 10.5 g of Methocel® K4M using a Hobart N50 mixer for 15 minutes. 259.3 g of Ludox® LS-30 (Sigma-Aldrich) colloidal $SiO_2$, together with 14 g PEG (Polyethylene Glycol 6000 (PEG 6000) from Alfa Aesar) dissolved in 216 g of de-ionized water, were added into the mixture whilst stirring in the Hobart N50 mixer. A total mixing time of 30 minutes was used for the wet mixing stage. The wet mixed product was extruded as above, using the MG-55 granulator from LCI Corporation in dome geometry with die size of 1.2 mm. 250 g of extrudates were marumerized using the QJ-230T Laboratory Marumerizer (Spheronizer) from LCI Corporation at a speed of 1000 rpm for 30 seconds, thus form B257. The beaded products were harvested, calcined and subsequently ion exchanged with lithium and activated following the procedure described in Example 1.

From Table 1, it can be seen that both these small bead samples with colloidal $SiO_2$ binder (B177 and B257) possess high $N_2$ adsorption rate, while the shorter mixing time for B257 actually help to achieve high SCRR/$\epsilon_p$ values.

EXAMPLE 8

Preparation of LiLSX Small Beads (10 wt % Other Colloidal $SiO_2$ Binder, 40.7-43.5 wt % $H_2O$ Plus Other Combustibles)—Samples B248 and B307 (Table 1 and FIGS. 4 and 5)

877 g of LSX powder from Zeochem LLC (and having a LOI value=20.2 wt %) was dry mixed with 10.5 g of Methocel® K4M using a Hobart N50 mixer for 15 minutes. 194.5 g colloidal $SiO_2$ of Ludox® HS-40 (the number denoting the silica content) or 155.6 g Ludox® HS-50 (both from Sigma-Aldrich) was added into the dry mixture. 382 g of de-ionized water was added for batch B248 (HS-40 binder) while 274 g water was added for batch B307 (HS-50 binder), whilst stirring in the Hobart N50 mixer, both without PEG additive. A total mixing time of 30 minutes was used for the wet mixing stage. The wet mixed product was extruded as above (see Example 1), using the MG-55 granulator from LCI Corporation with dome 1.2 mm geometry. The majority of extrudates were divided into 4-5 sub-batches of 250 g each and directly marumerized using the QJ-230T Laboratory Marumerizer (Spheronizer) from LCI Corporation, without an air-drying lead time or an air purge through the sample inlet port of the marumerizer. Both batches (B248 and B307) were marumerized at a speed of 1000 rpm for 30 seconds. The beaded products were harvested, calcined and subsequently ion exchanged with lithium and activated following the procedure described in Example 1.

From Table 1, it can be seen that while HS-40 colloidal $SiO_2$ binder yields similar rate performance to that of LS-30 colloidal $SiO_2$ source, the highly concentrated HS-50 is detrimental to the final product, both in terms of processing difficulty and the adsorption rate.

EXAMPLE 9

Preparation of Aged LiLSX Small Beads (10 wt % Colloidal $SiO_2$ Binder, 43.5 wt % $H_2O$ Plus Other Combustibles)—Samples B355 and B375 (Table 1 and FIG. 5)

For sample B355, a 90%-10% dry-weight ratio of LSX powder from Zeochem LLC and colloidal $SiO_2$ (Ludox® HS-40) were blended with additional water to a 47 wt % concentration on dry solids basis: e.g., 1130 g original LSX from Zeochem LLC (and having a LOI value=20.2 wt %) was dispersed into 250 g colloidal $SiO_2$ of Ludox® HS-40 and 750 g de-ionized water to form a uniform suspension. The suspension was allowed to dry out to form solid cake, which was subsequently broken up and then ground to fine powder having an LOI value of 24.0 wt %. In order to turn this solid mixture of 90 wt %-10 wt % zeolite-$SiO_2$ into beads, 924 g of the above ground-up powder was dry mixed with 10 g of Methocel® K4M using a Hobart N50 mixer for 60 minutes. 309 g de-ionized water was added whilst stirring in the Hobart N50 mixer for a total of 30 minutes of the wet mixing stage. The wet mixed product was extruded as above (see Example 1), using the MG-55 granulator from LCI Corporation with dome 1.2 mm geometry. 280 g of extrudates were marumerized using the QJ-230T Laboratory Marumerizer (Spheronizer) from LCI Corporation, at a speed of 1000 rpm for 30 seconds. The beaded products, B355, were harvested, calcined and subsequently ion exchanged with lithium and activated following the procedure described in Example 1.

For sample B375, 885 g LSX from Zeochem LLC (and having a LOI value=20.9 wt %) was dry mixed with 10.5 g of Methocel® K4M using a Hobart N50 mixer for 60 minutes. 194.5 g colloidal $SiO_2$ (Ludox® HS-40) was added into the dry mixture, together with 287 g de-ionized water, whilst stirring in the Hobart N50 mixer for a total of 60 minutes for the wet mixing stage. The wet mixed product was left to dry out in air at room temperature for a period of 48 hours to an, LOI value of 26.7 wt %. 1055.2 g the dried paste was re-wetted with 314 g of additional de-ionized water in the Hobart N50 mixer for total of 30 minutes. The paste from this second mixing step was then extruded using the MG-55 granulator from LCI Corporation with dome 1.2 mm geometry. 280 g of extrudates were marumerized using the QJ-230T Laboratory Marumerizer (Spheronizer) from LCI Corporation, at a speed of 1000 rpm for 30 seconds. The beaded products, B375, were harvested, calcined and subsequently ion exchanged with lithium and activated following the procedure described in Example 1.

From Table 1, it can be seen that both aged and beaded samples possess among the lower rates.

COMPARATIVE EXAMPLE 10

Preparation of LiLSX Small Beads (10 wt % Colloidal $Al_2O_3$ Binder, 46-47 wt % $H_2O$ Plus Other Combustibles)—Samples B401, B405 and B409 (Table 1 and FIGS. 6, 9 and 10)

Sample B401 was made using an equivalent process to B67 described in Example 5: 885 g of LSX powder from Zeochem LLC (and having a LOI value=20.9 wt %) was dry mixed with 10.5 g of Methocel® K4M using a Hobart N50 mixer for 15 minutes. Meanwhile, 105 g Catapal® D $Al_2O_3$ binder obtained from Sasol with a LOI value of 26 wt % was peptized with 17.8 g acetic acid and 53 g de-ionized water. The peptized alumina, zeolite and Methocel® K4M components were mixed with 396 g additional de-ionized water in the Hobart N50 mixer. A total mixing time of 30 minutes was used for the wet mixing stage. The wet mixed product was extruded as above (see Example 1) using a LCI MG-55 granulator with dome 1.2 mm. 280 g extrudates were marumerized at a speed of 1000 rpm for 30 seconds to form B401. The beaded products were harvested, calcined and subsequently ion exchanged with lithium and activated following the procedure described in Example 1.

Sample B405 and B409 were made with water dissolvable colloidal $Al_2O_3$ as binder, Disperal P2 and Dispal 18N4-80, respectively. 885 g of LSX powder from Zeochem LLC (and having a LOI value=20.9 wt %) was dry mixed with 10.5 g of Methocel® K4M using a Hobart N50 mixer for 15 minutes. 110 g colloidal $Al_2O_3$ binder of Disperal P2 (LOI of 29.1%) or 96.3 g Dispal 18N4-80 (LOI of 19.2%) was dissolved in a total of 462 g de-ionized water (for Disperal) or 449 g de-ionized water (for Dispal), and added to the above dry mixtures for a wet mixing in the Hobart mixer. A total mixing time of 30 minutes was used for the wet mixing stage. The wet mixed products was extruded as above (see Example 1), using the MG-55 granulator from LCI Corporation with dome 1.2 mm geometry. The spheronization was carried out using the QJ-230T Laboratory Marumerizer from LCI Corporation. Both batches (B405 and B409) were marumerized at a speed of 1000 rpm for 30 seconds. The beaded products were harvested, calcined and subsequently ion exchanged with lithium and activated following the procedure described in Example 1.

As can be seen from the cross section SEM image of sample B405 in FIG. 9, the zeolite crystals appear to be inter-dispersed by short fiber-like alumina species. Unlike the silica bound sample (B77 see FIG. 7), the alumina is discernible and appears to be filling in some of the macropores. Likewise, as can be seen from the cross section SEM image of sample B409 in FIG. 10, the zeolite crystals appear to be inter-dispersed by short fiber-like alumina species. Unlike the silica bound sample (B77 see FIG. 7), the alumina is discernible and appears to be filling in some of the macropores.

In summary, high rate gas separation adsorbent particles and their methods of manufacturing are disclosed. The methods include components mixing, agglomeration, calcination and optional ion exchange and subsequent activation. Unlike the adsorbent particles disclosed in U.S. Pat. No. 6,425,940, the high rate gas separation adsorbent particles of the present invention are not subjected to caustic digestion, can have higher porosity, contain a higher fraction of the binder in the product, and have similar and/or improved relative rate (RR), as well as size compensated relative rate (SCRR) and (SCRR/$\epsilon_p$) as described hereinabove. The data in Table 1 shows that the samples bound with Ludox® and prepared by extrusion-marumerization are highly porous (>45% by Hg porosimetry), but still possess crush strengths above 1 lbf. The adsorption rate data obtained by the breakthrough method (see, e.g. U.S. Pat. Nos. 6,425,940 or 6,790,260) confirms these LiLSX materials prepared using colloidal silica binders have high adsorption rates. With respect to the Actigel bound sample prepared by the extrusion-marumerization, the crush strengths of the adsorbent particles prepared with colloidal silica binder can be greater and the SCRR/$\epsilon_p$ values can be higher, suggesting the formulations described herein, which include colloidal silica binders, represent improvements over compositions described in U.S. Provisional Patent Application No. 60/853,154, now PCT/US2007/082087. These adsorbents can be used in VPSA, PSA, and TSA processes.

Without wishing to be constrained by any theories, it is believed that the small particle nature of the silica-species (nm sizes), and the fact that these are liquids and/or suspensions, helps improve the dispersion of the binder compared to conventional dry mixing of zeolite and clay particles. In the latter clay bound adsorbents, it is common to see clay rich regions inside a bead by SEM techniques (see FIG. 8) which confirm the difficulty to disperse clay binders. Similar SEM data on the adsorbents prepared using colloidal silica binders show no sign of binder matting. In fact, the binder is not readily discernable at all in these images (see FIG. 7). It is possible that the tiny particles (nm sized) of silica have selectively adhered to the zeolite crystal clusters and produced a particle structure which is closer to the ideal of spot-welded zeolite crystal clusters.

TABLE 1

| Batch # | [1]Binder | [2]Additives | [3]LOI (%) | [4]Extrusion mode | Crush Strength (lbf) | Size (mm) | [5]SCRR/$\epsilon_p$ | [6]$\epsilon_p$ |
|---|---|---|---|---|---|---|---|---|
| Formulation details and characterization data for LiLSX adsorbents ||||||||
| B77 | Ludox LS-30 (10%) | 1.5% K4M + 2% PEG | 45.8 | Dome 1.5 mm | 1.3 | 1.66 | 5.58 | 0.49 |
| B114 | Ludox LS-30 (10%) | 1.5% K4M + 0.5% PEG | 43.6 | Dome 2.0 mm | 1.8 | 1.59 | 6.13 | 0.47 |
| B125 | Ludox LS-30 (7%) | 1.5% K4M | 42.7 | Dome 1.5 mm | 1.0 | 1.40 | 4.86 | 0.47 |
| B133 | TMOS (7%) | 1.5% K4M | 48.7 | Dome 1.5 mm | 0.5 | 1.49 | 5.97 | 0.47 |
| B136 | Aesar (10%) | 1.5% K4M | 43.2 | Dome 1.5 mm | 1.2 | 1.65 | 6.10 | 0.46 |
| B142 | Ludox AS-30 (10%) | 1.5% K4M | 42.9 | Dome 1.5 mm | 1.1 | 1.62 | 5.34 | 0.46 |
| B177 | Ludox LS-30 (10%) | 1.5% K4M + 2% PEG | 43.5 | Dome 1.2 mm | 0.9 | 1.31 | 4.85 | 0.48 |
| B257 | Ludox LS-30 (10%) short mix | 1.5% K4M + 2% PEG | 43.5 | Dome 1.2 mm | 0.9 | 1.22 | 5.70 | 0.49 |
| B248 | Ludox HS-40 (10%) | 1.5% K4M | 43.5 | Dome 1.2 mm | 1.0 | 1.32 | 5.81 | 0.48 |
| B307 | Ludox HS-50 (10%) | 1.5% K4M | 40.7 | Dome 1.2 mm | 1.0 | 1.12 | 4.32 | 0.48 |

TABLE 1-continued

| Batch # | [1]Binder | [2]Additives | [3]LOI (%) | [4]Extrusion mode | Crush Strength (lbf) | Size (mm) | [5]SCRR/$\epsilon_p$ | [6]$\epsilon_p$ |
|---|---|---|---|---|---|---|---|---|
| B355 | Ludox HS-40 (10%) Grind | 1.5% K4M | 43.5 | Dome 1.2 mm | 0.7 | 1.22 | 4.38 | 0.46 |
| B375 | Ludox HS-40 (10%) Sintered | 1.5% K4M | 43.5 | Dome 1.2 mm | 1.2 | 1.21 | 3.99 | 0.45 |
| | | | Comparative Extrusion-Marumerized Adsorbents | | | | | |
| B67 | Catapal B (10%) | 1.5% K4M + 3% PEG | 48.3 | Basket 2.0 mm | 3.21 | 1.62 | 2.06 | 0.45 |
| B401 | Catapal D (10%) | 1.5% K4M | 47.0 | Dome 1.2 mm | 0.9 | 1.19 | 2.51 | 0.52 |
| B405 | Disperal P2 (10%) | 1.5% K4M | 47.0 | Dome 1.2 mm | 1.2 | 1.20 | 2.11 | 0.49 |
| B409 | Dispal 18N4 (10%) | 1.5% K4M | 46.0 | Dome 1.2 mm | 1.1 | 1.10 | 2.62 | 0.49 |
| [7]B70 | Actigel (10%) | 1.5% K4M + 2% PEG | 44.3 | Dome 2.0 mm | 0.93 | 1.54 | 4.83 | 0.52 |
| [7]B5M-2 | Actigel (10%) | 1.5% K4M | 48.3 | Dome 2.0 mm | 1.61 | 1.59 | 4.20 | 0.49 |
| [7]B100 | Bentonite (10%) | 1.5% K4M | 45.1 | Axial 2.0 mm | 2.09 | 1.66 | 2.31 | 0.47 |

[1]Binder = Colloidal silica (Ludox LS-30, Ludox AS-30, Ludox HS-40, Aeser, TMOS), peptized alumina (Catapal B, Catapal D), colloidal alumina (Disperal P2, Dispal 18N4), or clay (Actigel, a purified attapulgite or bentonite clay). Binder percentage is expressed on an original composition (i.e. non ion exchanged) total dry weight basis (binder$_{(dry\ wt)}$/(zeolite$_{(dry\ wt)}$ + binder$_{(dry\ wt)}$) × 100)
[2]K4M = Methocel K4M and PEG = Polyethylene Glycol
[3]LOI = Loss on Ignition determined at 1000° C. for the complete formulation prior to agglomeration. The value signifies the percentage of removable components present in the final formulation expressed on a total wet weight basis
[4]Extrusion geometry and die size (mm)
[5]SCRR = Size Compensated relative rate (mmol mm$^2$/g s)
[6]$\epsilon_p$ = Porosity determined by Hg Porosimetry
[7]B70, B5M-2 and B100 = see discussion above and U.S. Provisional Patent Application No. 60/853,154, filed on Oct. 20, 2006, now PCT Application No. PCT/US2007/082087, filed on Oct. 22, 2007, both of which are incorporated herein by reference in their entirety Alternative ways to practice the invention include the use of agglomeration processes outside of extrusion-spheronization, especially pan-granulation (or pan-pelletization) as well as the production and agglomeration of adsorbents having different compositions. For example and while not to be construed as limiting, pan granulation (or pan-pelletization) as the agglomeration step may be preferred for large scale production of adsorbent particles in accordance with the present invention.

Another embodiment of the present invention involves the production of large beads of adsorbent, nominally 3 mm, having the desirable high rate-high strength characteristics common to the adsorbent materials described in the present invention. Such large adsorbent beads can be useful in applications such as air pre-purification where the intent is to remove contaminants including $CO_2$ and $H_2O$ prior to air separation by cryogenic technologies.

Those skilled in the art will recognize that the formulations described above for processing by extrusion-spheronization (marumerization) can be adapted for other agglomeration techniques, including pan-granulation and even high pressure extrusion followed by spheronization. The modifications required to adapt the formulations presented will be largely through the use of different water contents to produce homogeneously dispersed mixtures which are compatible with the requirements of these different agglomeration equipments. In the case of pan granulation the combustible additives used as extrusion aids may also be omitted. After agglomeration by these other processing methods the other steps including drying and calcination, as well as ion exchange and activation can be performed as described above.

Production of Adsorbents with Different Compositions

The present invention also includes adsorbents with compositions other then NaKLSX and LiLSX that can be prepared. Such adsorbents in the form of particles (e.g. beads or pellets (extrudates) can offer the high rate-high strength advantages which are features of the adsorbents of this invention. Extra steps can be applied to the core process as needed, for example, an ion exchange step can be performed first on the as-made powder to alter its composition as required prior to any of the mixing stages. Other additives including impregnates can also be added to the formulation and included within the mixing stages. For example, a salt could be added to the adsorbent by dissolving the required quantity in water and adding this along with the other ingredients during the mixing stage.

In particular, other zeolite X compositions and mixed compositions including CaLSX and mixed Li/CaLSX can be prepared using the steps described. Other zeolites in the X family can also be agglomerated using the procedures described herein including X zeolites having $SiO_2/Al_2O_3$ ratios in the range 2.5-2.0. The methods described herein can also be advantageously used for forming other low silica zeolites including zeolite A, zeolite Y, mordenite, chabazite, and clinoptilolite.

Another class of adsorbent particles which can be advantageously prepared using the forming methods of the present invention are large bead adsorbent particles for contaminant removal especially $CO_2$ and $H_2O$ in temperature swing adsorption (TSA) air pre-purifiers, including zeolites commonly designated 13X or 10X. In this context, "large bead" means having average adsorbent particle diameters around 3 mm. In the applications mentioned herein, high strength-high rate particles are particularly desirable. To produce larger particles by extrusion-spheronization, an appropriately sized die must be selected for the extruder and an appropriately sized friction plate must be used in the spheronizer/marumerizer. Pan-granulation (or pan-pelletization) can also be used to make these products as described above. In some embodiments, it may be possible or desirable to achieve the mixing and agglomeration steps in one piece of equipment.

Yet another class of adsorbent particles which can be advantageously prepared using the agglomeration formulations and forming methods of the present invention are small bead LiLSX adsorbents for medical oxygen concentrators. Such devices also require high rate-high strength adsorbents for optimum performance. Beads as small as 0.5 mm can be prepared by extrusion-spheronization by selecting an appropriately sized die for the extruder and an appropriately sized friction plate for the spheronizer/marumerizer. Pan-granulation (or pan-pelletization) can also be used to make these products as described above.

Although the invention has been described in detail with reference to certain preferred embodiments, those skilled in the art will recognize that there are other embodiments within the spirit and the scope of the claims.

What is claimed is:

1. A collection of adsorbent particles, the particles comprising an adsorbent and a silica binder formed by a method comprising the steps of: mixing, agglomeration and calcination,
    wherein the silica binder is employed in the form of a colloidal solution in the mixing and/or agglomeration stages of the forming method and wherein the binder content in the adsorbent particles is not greater than about 15 wt % as determined by: (binder$_{(dry\ wt)}$/(adsorbent)$_{(dry\ wt)}$+binder$_{(dry\ wt)}$×100) on a dry weight basis;
    wherein the collection of particles has a SCRR/$\epsilon_p$ (mmol mm$^2$/g s) of greater than or equal to 4.0 as determined for a Li form of the collection of particles in which at least 90% of the exchangeable cations of the collection of adsorbents have been exchanged with Li where the degree of exchange is expressed as a ratio between the number of Li cations and number of aluminum atoms of the adsorbent present in tetrahedral positions and wherein the particles have an average crush strength of at least 0.9 lbf when such adsorbent has an average particle size of at least about 1.0 mm; and
    wherein the collection of particles have been subjected to ion exchange and activation such that the silica binder content does not exceed about 18 wt % of the ion-exchanged collection of particles.

2. The collection of particles of claim 1, wherein the collection of particles comprise zeolite X, low silica zeolite X or mixtures thereof.

3. The collection of particles of claim 1, wherein the collection of particles comprise LiX, NaX, LiLSX, NaLSX, or NaY particles.

4. The collection of particles of claim 3, wherein the collection of particles includes LiX particles in which at least 95% of the exchangeable cations of the collection of particles have been exchanged with Li where the degree of exchange is expressed as a ratio between the number of Li cations and number of aluminum atoms of the adsorbent present in tetrahedral positions.

5. The collection of particles of claim 1, wherein the average crush strength of the particles is at least 1.0 lbf.

6. The collection of particles of claim 1, wherein the collection of particles comprise heads having an average diameter of at least 1.5 mm.

7. The collection of particles of claim 1, wherein the collection of particles is formed without the steps of caustic digestion.

8. A gas separation process, the process comprising:
    introducing a feed gas comprising a less readily adsorbable component and a more readily adsorbable component into at least one adsorbent bed;
    passing the feed gas over a collection of particles in the at least one adsorbent bed, the particles comprising an adsorbent and a silica binder such that the more readily adsorbable component is adsorbed; and
    withdrawing a product gas enriched in the less readily adsorbable component;
    wherein the collection of particles is that of claim 1.

9. A method of manufacturing the collection of particles of claim 1, the process comprising:
    mixing an adsorbent with appropriate quantities of a colloidal silica binder solution to achieve a binder content of not greater than about 15 wt % as determined by: (binder$_{(dry\ wt)}$/(adsorbent)$_{(dry\ wt)}$+binder$_{(dry\ wt)}$×100) on a dry weight basis;
    agglomerating the adsorbent and the silica binder to form particles of adsorbent and silica binder; and
    calcining the agglomerated particles to form the collection of particles wherein the collection of particles has a SCRR/$\epsilon_p$ (mmol mm$^2$/g s) of at least 4.0 as determined for a Li form of the collection of particles in which at least 90% of the exchangeable cations of the collection of particles have been exchanged with Li where the degree of exchange is expressed as a ratio between the number of Li cations and number of aluminum atoms of the adsorbent present in tetrahedral positions and wherein the particles have an average crush strength of at least 0.9 lbf when such collection of particles has an average particle size of at least about 1.0 mm.

10. The method of claim 9, wherein the step of agglomerating comprises extrusion and is followed by a step of marumerization.

11. The method of claim 9, wherein the step of agglomerating comprises pan granulation.

12. The method of claim 9, further comprising the step of ion exchange.

13. The collection of adsorbent particles of claim 1, wherein $\epsilon_p$ is the porosity and SCRR is determined by:

$$SCRR(p)=RR(p)*[d_{particle}]^2;$$

where $d_{particle}$ is the average diameter derived from the particle size distribution, (p) is total pressure of the system, and Relative Rate defined as:

$$RR(p)=[\Delta N_2(Y_F,Y_O)]/(t_2-t_1);$$

wherein $\Delta N_2$ is nitrogen loading for $Y_O$ to $Y_F$; $Y_F$ is composition of feed which has a mole fraction of oxygen equal to 0.209, $Y_O$ is composition of regeneration gas which has a mole fraction of oxygen equal to 0.9999, $t_2$ is the time when mole fraction of oxygen, $Y_2$, has a specified value and $t_1$ is the time when mole fraction of oxygen $Y_1$ has a specified value.

14. The collection of particles of claim 13, wherein $t_2$ is the time when mole fraction of oxygen, $Y_2$ is equal to 0.3, and $t_1$ is the time when mole fraction of oxygen $Y_1$ is equal to 0.9.

* * * * *